(12) United States Patent
Sonoda et al.

(10) Patent No.: US 7,437,750 B1
(45) Date of Patent: Oct. 14, 2008

(54) DATA TRANSCEIVING SYSTEM AND METHOD THEREFOR

(75) Inventors: Yasuyuki Sonoda, Kyoto (JP); Tatsuya Shimoji, Neyagawa (JP); Kazuo Okamura, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/545,851

(22) Filed: Apr. 10, 2000

(30) Foreign Application Priority Data

Apr. 12, 1999 (JP) ................................. 11-103619

(51) Int. Cl.
*H04N 5/445* (2006.01)
*H04N 7/173* (2006.01)

(52) U.S. Cl. .......................... 725/61; 725/121; 725/122

(58) Field of Classification Search ................. 725/121, 725/122, 61, 131, 132; 709/217–219; 379/92.04
See application file for complete search history.

(56) References Cited

U.S. PATENT DOCUMENTS

| | | | |
|---|---|---|---|
| 4,829,558 A | | 5/1989 | Welsh |
| 4,930,118 A | | 5/1990 | Sugihara |
| 5,181,107 A | * | 1/1993 | Rhoades ..................... 725/105 |
| 5,270,809 A | * | 12/1993 | Gammie et al. ............. 725/114 |
| 5,444,718 A | | 8/1995 | Ejzak et al. |
| 5,572,517 A | * | 11/1996 | Safadi ........................ 370/431 |
| 5,754,940 A | | 5/1998 | Smith et al. |
| 5,768,280 A | | 6/1998 | Way |
| 5,794,117 A | | 8/1998 | Bernard |
| 5,818,825 A | * | 10/1998 | Corrigan et al. ............. 725/126 |
| 5,859,899 A | | 1/1999 | Sakai et al. |
| 5,966,636 A | * | 10/1999 | Corrigan et al. ............. 725/121 |
| 5,978,381 A | * | 11/1999 | Perlman et al. ............. 370/432 |
| 5,999,224 A | * | 12/1999 | Maeda et al. ................ 725/122 |

(Continued)

FOREIGN PATENT DOCUMENTS

CN 1111889 A 11/1995

(Continued)

OTHER PUBLICATIONS

European Search Report, Application No. 00303030.1-2202, Mailing Date: Jun. 18, 2002.

(Continued)

*Primary Examiner*—Hunter B. Lonsberry
(74) *Attorney, Agent, or Firm*—Studebaker & Brackett PC; Donald R. Studebaker

(57) ABSTRACT

An object is to perform retrial processing according to the allowable volume on communication lines made available at response information receiving equipment. A broadcast unit 140, when broadcasting video and audio, includes retrial information in that broadcast, according to the allowable volume on the communication lines between the television receivers and the response information receiving equipment 150. Television receivers effect display based on the received digital data. Response information input by users is sent to the response information receiving equipment 150. The television receivers make retrial transmissions based on the received retrial information when communications could not be established with the response information receiving equipment 150. This retrial information is responsive to the allowable volume on the communication lines between the television receivers and the response information receiving equipment 150, wherefore retrial transmissions are made according to the allowable volume on the communication lines.

25 Claims, 27 Drawing Sheets

U.S. PATENT DOCUMENTS

| | | | | |
|---|---|---|---|---|
| 6,012,086 | A * | 1/2000 | Lowell | 709/218 |
| 6,035,324 | A * | 3/2000 | Chang et al. | 709/203 |
| 6,112,181 | A * | 8/2000 | Shear et al. | 705/1 |
| 6,237,146 | B1 * | 5/2001 | Richards et al. | 725/131 |
| 6,381,748 | B1 * | 4/2002 | Lin et al. | 725/109 |

FOREIGN PATENT DOCUMENTS

| | | |
|---|---|---|
| EP | 0 594 353 | 4/1994 |
| JP | 08-139806 | 5/1996 |
| JP | 08-205123 | 8/1996 |
| JP | 8-275140 | 10/1996 |
| JP | 09-070035 | 3/1997 |
| JP | 09-093366 | 4/1997 |
| JP | 09-098411 | 4/1997 |
| JP | 09-163346 | 6/1997 |
| JP | 09-298733 | 11/1997 |
| JP | 10-155026 | 6/1998 |

OTHER PUBLICATIONS

Suzuki, Tatsuo et al., "*A Participatory Interactive TV Program Using JoiNet™ System*", NTT Human-Interface Labs, Sep. 13, 1996, pp. 21-28.

Suzuki, Tatsuo et al., "JoiNet™ Information Communication Environment", The Institute of Electronics Information and Communication Engineers, Aug. 1995, pp. 27-32.

Notification of Reason(s) for Refusal, Feb. 4, 2004.

* cited by examiner

FIG.4

PACKETED DATA CONFIGURATION

| PID | CONTENT DATA |
|-----|--------------|

FIG.5

PMT1  (PID=0×11)

| VIDEO | | AUDIO | |
|---|---|---|---|
| PID OF ECM | PID OF ES | PID OF ECM | PID OF ES |
| 0×21 | 0×22 | 0×21 | 0×24 |

FIG.6

PAT  (PID=0×00)

| SERVICE | PID OF PMT |
|---------|------------|
| SV11 | 0×0011 |
| SV12 | 0×0012 |
| SV13 | 0×0013 |
| SV14 | 0×0014 |

| PID OF NIT |
|------------|
| 0×18 |

FIG.7

NIT (PID=0×18)

| TS | TRANSMISSION SPECIFICATION | SERVICE LIST |
|---|---|---|
| TS1 | f1 | SV11、SV12、SV13、SV14 |
| TS2 | f2 | SV21、SV22、SV23、SV24 |
| ⋮ | ⋮ | ⋮ |

FIG.12

PMT1 (PID=0X0011)

| | PID OF ES | PID OF ECM | |
|---|---|---|---|
| VIDEO | 0X0096 | 0X0082 | ES (V) 11 |
| | 0X0097 | 0X0082 | ES (V) 12 |
| AUDIO | 0X0098 | 0X0082 | ES (A) 11 |
| | 0X0099 | 0X0082 | ES (A) 12 |
| NAVIGATION DATA | 0X0092 | 0X0082 | NVT1 |
| | 0X0093 | 0X0082 | NVT2 |

ENTRY CONTENTS

| VIDEO | AUDIO | NAVIGATION DATA |
|---|---|---|
| 0X0096 | 0X0098 | 0X0092 |

ES (V) 11 ES (A) 11  NVT1

FIG.13

PAT (PID=0X0000)

| SERVICE | PID OF PMT |
|---|---|
| SV11 | 0X0011 |
| SV12 | 0X0012 |
| SV13 | 0X0013 |
| SV14 | 0X0014 |

FIG.14

OBJECT TABLE

| INDEX | TYPE | X | Y | HANDLER | NORMAL STATUS | FOCUS STATUS |
|---|---|---|---|---|---|---|
| 0 | BUTTON | 500 | 200 | 0 | 0 | 1 |
| 1 | BUTTON | 500 | 400 | 1 | 2 | 3 |

HANDLER DEFINITION TABLE

| INDEX | INSTRUCTION (SCRIPT) |
|---|---|
| 0 | regist_delayed_connection<br>(001;<br>06-6361-XXXX;<br>A-395;<br>1999,1,10,12:00:00;<br>02:00:00;<br>1999,1,10,15:00:00;<br>00:05:00) |
| 1 | goto_contents(Index1) |

HYPERLINK TABLE

| INDEX | VIDEO | AUDIO | NAVIGATION DATA |
|---|---|---|---|
| 0 | 0x0096 | 0x0098 | 0x0092 |
| 1 | 0x0097 | 0x0099 | 0x0093 |

BIT MAP TABLE

| INDEX | DATA (BIT MAP DATA) |
|---|---|
| 0 | MAKE APPLICATION TO CENTER |
| 1 | MAKE APPLICATION TO CENTER |
| 2 | TO APPAREL SHOP |
| 3 | TO APPAREL SHOP |

FIG.15

OBJECT TABLE

| INDEX | TYPE | X | Y | HANDLER | NORMAL STATUS | FOCUS STATUS |
|---|---|---|---|---|---|---|
| 0 | BUTTON | 500 | 200 | 0 | 0 | 1 |
| 1 | BUTTON | 500 | 400 | 1 | 2 | 3 |

HANDLER DEFINITION TABLE

| INDEX | INSTRUCTION (SCRIPT) |
|---|---|
| 0 | regist_delayed_connection<br>(007;<br>06-6900-XXXX;<br>A-133;<br>1999,1,10,13:00:00;<br>00:30:00;<br>1999,1,10,16:00:00;<br>00:10:00) |
| 1 | goto_contents(index0) |

HYPERLINK TABLE

| INDEX | VIDEO | AUDIO | NAVIGATION DATA |
|---|---|---|---|
| 0 | 0x0096 | 0x0098 | 0x0092 |
| 1 | 0x0097 | 0x0099 | 0x0093 |

BIT MAP TABLE

| INDEX | DATA (BIT MAP DATA) |
|---|---|
| 0 | MAKE APPLICATION TO CENTER |
| 1 | MAKE APPLICATION TO CENTER |
| 2 | TO HOUSEHOLD PRODUCT SHOP |
| 3 | TO HOUSEHOLD PRODUCT SHOP |

FIG.24

| ORDER REGISTRATION NUMBER | tel | PRODUCT CODE | TRANSMISSION SCHEDULING TIME | SERVICE END TIME | RETRIAL PERIOD |
|---|---|---|---|---|---|
| 001 | 06-6361-XXXX | A-395 | 1999/1/10 13:52:00 | 1999/1/10 15:00:00 | 5 MINUTES |
| 007 | 06-6900-XXXX | B-133 | 1999/1/10 13:30:00 | 1999/1/10 16:00:00 | 10 MINUTES |

FIG.27

| ORDER REGISTRATION NUMBER | DATE | TELEPHONE NUMBER | PRODUCT CODE | HISTORY |
|---|---|---|---|---|
| 001 | 1999/1/10 | 06-6361-XXXX | A-395 | 13:52 BUSY<br>13:57 BUSY<br>----<br>14:12 SUCCESSFUL |
| 007 | 1999/1/10 | 06-6900-XXXX | B-133 | 13:30 BUSY<br>13:40 BUSY<br>----<br>16:00 TIMEOUT |

US 7,437,750 B1

DATA TRANSCEIVING SYSTEM AND METHOD THEREFOR

CROSS REFERENCE TO RELATED APPLICATIONS

The disclosure of Japanese Patent Application No. Hei 11-103619 (filed on Apr. 12, 1999), including specification, claims, drawings and abstract is incorporated herein by reference in its entirety.

BACKGROUND OF THE INVENTION

1. Field of the Invention

This invention relates to a data transceiving system, and particularly to retrial transmission.

2. Description of the Related Art

In Japanese Patent Application Laid-Open No. H8-275140/1996 (published) a bidirectional program response apparatus is disclosed for randomly delaying transmission times from the time of a response operation, receiving terminal by receiving terminal, in order to prevent the concentration of transmissions of response information to a bidirectional program. Using such an apparatus, the actual times of transmissions from a broadcast receiving party are delayed and dispersed even when response operations are temporarily concentrated for the broadcast. Thus it is possible to avoid telephone line blowout between the receiving terminals and the center.

The following problem arises, however, when the time of response information transmission is delay-processed in this manner. In cases where, as a result of a delayed transmission, a telephone connection with the center cannot be made, even though a user believes that a shopping request has been made, a situation will arise where no response information has actually been transmitted to the center.

SUMMARY OF THE INVENTION

An object of the present invention is to provide a data transceiving system or method therefor wherewith the problem noted above can be resolved, and, when response information has been transmitted after a delay, the response information receiving equipment can more definitely receive the response information.

Another object of the present invention is to provide a data transceiving system or method therefor wherewith retrials can be made according to the allowed volume on the communication line between the response information receiving equipment and the television receivers.

In accordance with characteristics of the present invention, there is provided a data transceiving system wherein: data are sent from a broadcasting station to a plurality of television receivers by broadcasting; response information is sent from said television receivers to response information receiving equipment by communication lines; and said broadcast station makes transmissions inclusive of retrial information to enable said television receivers to make retrial transmissions when said television receivers are unable to establish communications with said response information receiving equipment.

In accordance with characteristics of the present invention, there is provided a data transceiving system wherein: data are sent from a broadcasting station to a plurality of television receivers by broadcasting; response information is sent from said television receivers to response information receiving equipment by communication lines; and said television receivers, upon receiving data containing retrial information to enable retrial transmissions with said response information receiving equipment when communications could not be established with said response information receiving equipment, retransmit said response information on basis of that retrial information.

In accordance with characteristics of the present invention, there is provided a data transceiving system comprising: a broadcast unit for broadcasting data; a plurality of television receivers for receiving said data and transmitting response information over communication lines; and response information receiving equipment, connected via said communication lines to said television receivers, for receiving response information from said television receivers; wherein: said broadcast unit sends retrial information, according to allowable volume of said communication lines, included in said data; and said television receivers retrial-transmit said response information on basis of said retrial information received when communications could not be established with said response information receiving equipment.

In accordance with characteristics of the present invention, there is provided a television receiver for receiving data broadcast from a broadcast unit and displaying images, and transmitting response information to response information receiving equipment over communication lines, wherein: said response information is retrial-transmitted to said response information receiving equipment, on basis of retrial information received from said broadcast unit, when communications could not be established with said response information receiving equipment.

In accordance with characteristics of the present invention, there is provided a television receiver comprising: means for receiving data sent from a broadcast unit; means for outputting display data based on said received data to display means; and communication means, being means that transmit said response information over communication lines, for retrial-transmitting said response information, on basis of retrial information contained in said received data, when communications could not be established with said response information receiving equipment.

In accordance with characteristics of the present invention, there is provided a television receiver comprising: means for receiving data sent from a broadcast unit; means for displaying display data based on said received data; and communication means, being means that transmit response information over communication lines, for retrial-transmitting said response information, on basis of retrial information sent from said broadcast unit, when communications could not be established with response information receiving equipment.

In accordance with characteristics of the present invention, there is provided a data receiver comprising: means for receiving data sent from a broadcast unit; and communication means for sending response information over communication lines; wherein: said communication means retrial-transmit said response information, based on retrial information contained in said data received, when communications could not be established with response information receiving equipment.

In accordance with characteristics of the present invention, there is provided a data transceiving system wherein: data are sent from a broadcast station to a plurality of data receivers by broadcasting; response information is sent after a delay from said plurality of data receivers to response information receiving equipment by communication lines; said broadcast station sends retrial information contained in said data; said data receiver resends said response information based on said retrial information when communications could not be established with said response information receiving equipment; and said response information receiving equipment, upon receiving said response information from said data receiver, notifies a user of said data receiver that response information was received by a communication line other than said communication lines.

In accordance with characteristics of the present invention, there is provided a television receiver comprising: a tuner for selecting a transport stream from data sent from a broadcast unit; a transport decoder for selecting display data of a desired service from said selected transport stream; an AV decoder for outputting said display data of said selected service to a monitor; a control input unit wherewith a user inputs response information; a line communication unit for sending said response information over a communication line; a CPU; and a memory in which a control program for said CPU is stored; wherein: said control program retrial-transmits said response information via said line communication unit, based on retrial information contained in said data, when communications could not be established with said response information receiving equipment.

In accordance with characteristics of the present invention, there is provided a data transceiving system comprising: a server wherein prescribed data are stored in memory unit; and a plurality of computers capable of being connected to said server; wherein: said server, when said computers send download requests to said server, send data specified by said download requests to said computers; said server, upon receiving said download requests, sends download request transmission-delaying programs to said computers making those download requests; and said computers send download requests, after a delay, to said server, based on said download request transmission-delaying program.

In accordance with characteristics of the present invention, there is provided a data transceiving system server which, being a server connected to a plurality of computers, upon receiving a download request from any computer, does not cause data specified by that download request to be transmitted to said computer making that download request, but rather sends thereto a download request transmission-delaying program which sends download requests to said server after a delay.

In accordance with characteristics of the present invention, there is provided a data transceiving system comprising: a broadcast unit for broadcasting data: a plurality of data receivers for receiving said data and transmitting response information over communication lines; and response information receiving equipment connected to said data receivers via said communication lines for receiving response information from said data receivers; wherein: said broadcast unit sends probability variation data, included in said data, wherewith probability of generating a transmission time varies over time; and said data receivers determine transmission scheduling times for transmitting to said response information receiving equipment on basis of said received probability variation data.

In accordance with characteristics of the present invention, there is provided a data transceiving system for transmitting data by broadcast from a broadcast station to a plurality of data receivers, and transmitting response information from said data receivers to response information receiving equipment by communication lines, wherein: said receivers, upon receiving probability variation data wherewith the probability wherewith transmission times are generated varies over time from said broadcast unit, determine transmission scheduling times for transmitting to said response information receiving equipment on basis of said received probability variation data.

In accordance with characteristics of the present invention, there is provided a data receiver for receiving data broadcast from a broadcast unit and sending response information over a communication line to response information receiving equipment, wherein: transmission scheduling times for transmitting to said response information receiving equipment are determined on basis of received probability variation data, when said probability variation data, wherewith probability with which transmission times are generated varies over time, are received from said broadcast unit.

In accordance with characteristics of the present invention, there is provided a data transceiving method for receiving broadcast data and sending response information over communication lines, wherein: when data inclusive of retrial information according to allowable volume on said communication lines are received, when communication could not be established using said communication lines, said response information are retrial-transmitted on basis of said received retrial information.

In accordance with characteristics of the present invention, there is provided a data transceiving method for sending response information over communication lines when data broadcast are received, wherein: said data include probability variation data wherewith probability of generating a transmission time varies over time; and transmission scheduling times for transmitting over said communication lines are determined on basis of said received probability variation data.

While the novel features of the invention are set forth in a general fashion, both as to organization and content. Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

BRIEF DESCRIPTION OF THE DRAWINGS

FIG. 4 is a diagram of the structure of packeted data;

FIG. 5 is a diagram of the content of control data PMT1;

FIG. 6 is a diagram of the content of control data PAT;

FIG. 7 is a diagram of the content of control data NIT;

FIG. 12 is a diagram of the content of control data PMT1;

FIG. 13 is a diagram of the content of control data PAT;

FIG. 14 is a diagram of the content of navigation data NVT1;

FIG. 15 is a diagram of the content of navigation data NVT2;

FIG. 24 is a delayed transmission registration information table;

FIG. 27 is a diagram of the content of a communication log recorded in a memory 60;

DESCRIPTION OF THE PREFERRED EMBODIMENTS

Table of Contents

1. Satellite Broadcast System Overview
1.1 Radio Signal Transmission in Satellite Broadcasting
1.2 Transmitter Unit Configuration
1.3 Transport Stream Structure
1.4 Receiver Unit Configuration
2. Bidirectional Transceiving System 1
2.1 Overview
2.2 Detailed Description
2.3 Transmission Data
2.4 Concrete Configuration Example for and Operation of Receiver
2.5 Delayed Transmission Processing
2.6 Cause Detection Processing for Delayed Transmissions
2.7 Computation of Initial Scheduled Transmission Time
3. Other Embodiments A description is given below of the present invention as applied to satellite broadcasting. If data broadcasting is in view, however, the present invention can be applied to ground wave broadcasting, cable TV and other land line broadcasting, and internet broadcasting, etc. Before describing an embodiment of the present invention, an overview of a satellite broadcasting system is first given.

Figure 1:
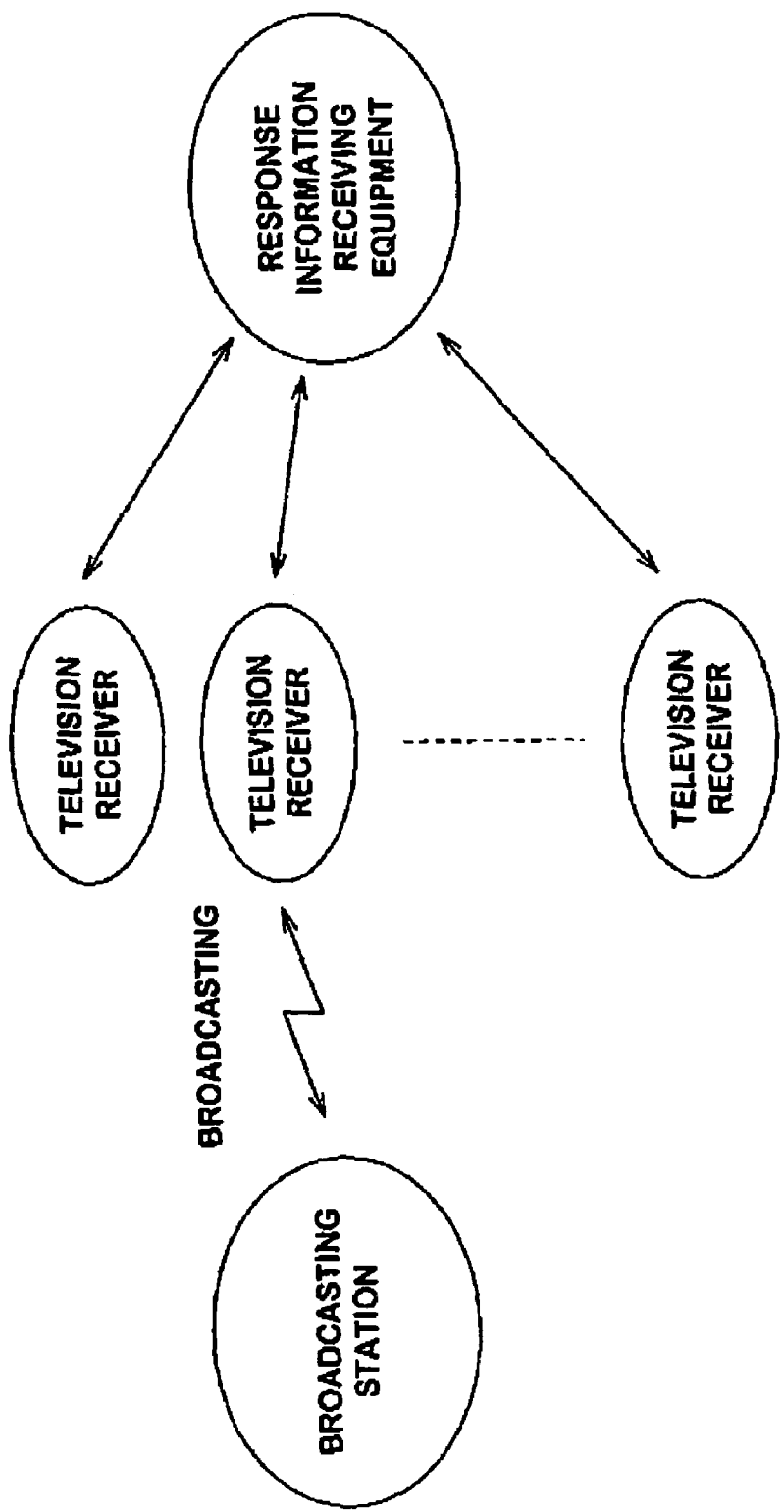
FIG. 1 is a diagram showing how radio signals are sent in satellite broadcasting.

1. Satellite Broadcasting System Overview 1.1 Radio Signal Transmission in Satellite Broadcasting In FIG. 1 is represented a model of how radio signals are sent in satellite broadcasting. A radio signal from a ground station 2 is sent via a broadcast satellite 4 back to earth. Multiple transport streams TS1, TS2, and TS3 are sent from the broadcast satellite 4. These transport streams are differentiated by frequency and plane of polarization, etc.

In the transport stream TS1, a plurality of services (corresponding to channels in ground wave broadcasting) SV11, SV12, SV13, and SV14 are packeted and multiplexed by time division. In transport stream TS2, similarly, services SV21, SV22, SV23, and SV24 are multiplexed, and in transport stream TS3, services SV31, SV32, SV33, and SV34 are multiplexed. In each transport stream, furthermore, in addition to video data and audio data for the services, control data for indicating program information, control data for indicating the current time, and control data that are necessary in connection with packeting, etc., are also sent.

In FIG. 1, three transport streams are represented. In actual practice, however, many more transport streams are sent. In FIG. 1, furthermore, four services are shown multiplexed in each transport stream. In actual practice, however, many more services are multiplexed.

1.2 Transmitter Unit Configuration

Figure 2:
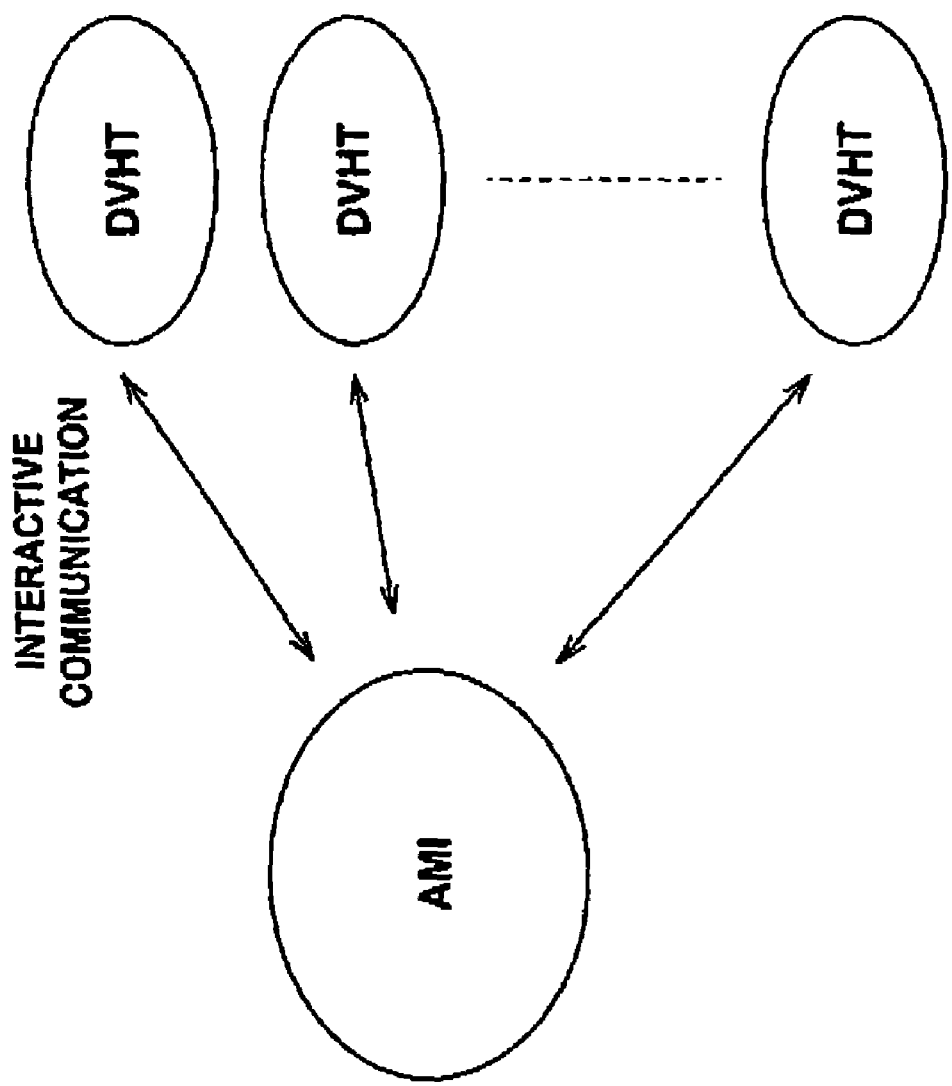
FIG. 2 is a diagram representing the configuration of transmitters in satellite broadcasting.

In FIG. 2 is represented a configuration for a transmitter unit for generating and transmitting the transport streams described in the foregoing. Only the transport stream TS1 is represented in FIG. 2, but the other transport streams TS2 and TS3 are generated in the same way.

Video/audio data ES11 of the service SV11 are compressed by an encoder E1 and sent to a multiplexer 10. Similarly, video/audio data ES12 of the service SV12 are compressed by an encoder E2 and sent to the multiplexer 10, video/audio data ES13 of the service SV13 are compressed by an encoder E3 and sent to the multiplexer 10, and video/audio data ES14 of the service SV14 are compressed by an encoder E4 and sent to the multiplexer 10.

A control data generator 6 generates control data for packet multiplexing, control data for indicating program information, and control data for indicating the current time. The control data for packet multiplexing are added for such purposes as correctly identifying the video/audio data of the plurality of services time-divided and packeted.

The multiplexer 10 time-divides the control data and the compressed video/audio data ES11, ES12, ES13, and ES14 to form fixed-length packets which it sends as transport stream TS1.

A scrambler 12 scrambles the output packets using a scrambling key provided by a scrambling key controller 16. The scrambled transport stream TS1 is modulated in a modulator 14 and broadcast to viewers via the broadcast satellite 4.

The scrambling key used in the scrambler 12 is encrypted by an ECM generator 8 and rendered into ECM (entitlement control message) data. That is, ECM data are generated that further encrypt a key for undoing the scrambling. The multiplexer 10 forms packets that include these ECM data.

1.3 Transport Stream Structure

Figure 3:
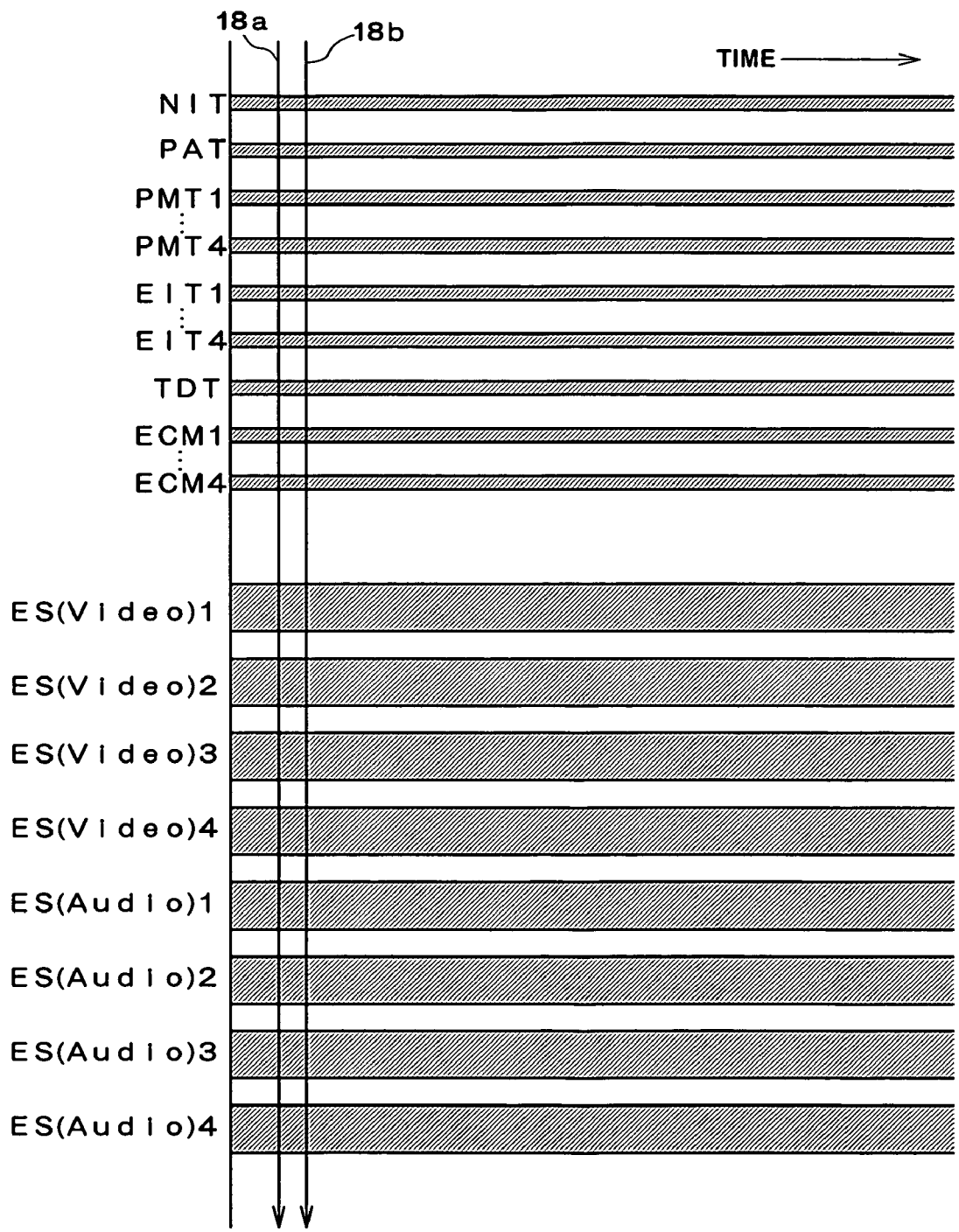
FIG. 3 is a diagram representing a transport stream sent in satellite broadcasting.

In the transport stream TS1 generated by the transmitter unit diagrammed in FIG. 2 are multiplexed the video data ES(V)1 and audio data ES(A)1 of the service SV11, the video data ES(V)2 and audio data ES(A)2 of the service SV12, the video data ES(V)3 and audio data ES(A)3 of the service SV13, and the video data ES(V)4 and audio data ES(A)4 of the service SV14, as diagrammed in FIG. 3.

Control data NIT, PAT, PMT1, PMT2, PMT3, and PMT4 for packet multiplexing are also multiplexed. The these control data can separate the multiplexed video/audio data of the services SV11, SV12, SV13, and SV14.

In addition, control data ECM1, ECM2, ECM3, and ECM4 for scrambling keys, control data EIT1, EIT2, EIT3, and EIT4 for indicating program information, and control data TDT for indicating the current time, etc., are multiplexed. In actual practice, moreover, much more control data are multiplexed (not shown in drawings).

Figure 18:
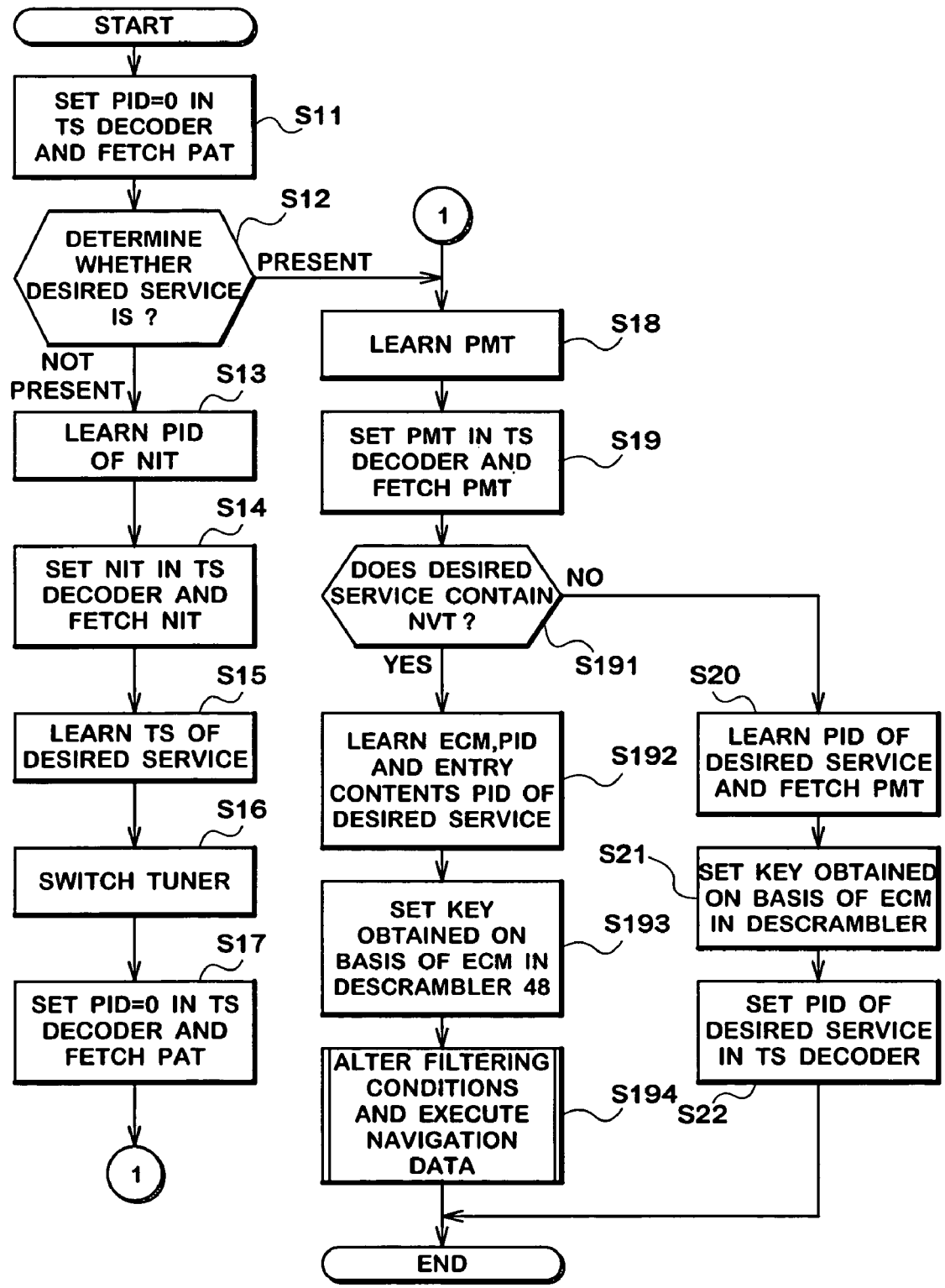
FIG. 18 is a flowchart for a program in reception processing.

Packeting is performed as indicated by the vertical line 18a in FIG. 18. That is, packeting is performed in the order of control data NIT, PAT, PMT, EIT, TDT, ECM, video data ES(V), and audio data ES(A). When the packeting is completed to the audio data ES(A)4, packeting is then repeated beginning with control data NIT (cf. vertical line 18b).

In FIG. 4 is diagrammed the basic structure of packeted data. Both control data and video/audio data are made into packets having the data structure diagrammed in FIG. 4. A PIDentification (hereinafter referred to as PID) is attached at the head of the packeted data. The PID is a code that is uniquely added to each of the packets to identify them. The content data are the data to be packeted (control data, video/audio data, etc.).

In FIG. 5 are diagrammed the data content of the control data PMT1 for packet multiplexing. In PMT1 are written the PID for the video data ES(V)1 and ES(A)1 for the service SV11, and the PID for the ECM1 for unscrambling those data. In PMT2, PMT3, and PMT4 are similarly written PIDs for the services SV12, SV13, and SV14, respectively.

As diagrammed in FIG. 6, in the PAT are written the PID for the PMT1 corresponding to the service SV11, the PID for the PMT2 corresponding to the service SV12, the PID for the PMT3 corresponding to the service SV13, and the PID for the PMT4 corresponding to the service SV14.

As diagrammed in FIG. 7, in the NIT are written such transmission specifications as frequency and plane of polarization for all of the transport streams TS1, TS2, and TS3, together with lists of services multiplexed in those transport streams. Thus it is possible to know to which transport stream of what frequency a given service has been multiplexed.

1.4 Receiver Unit Configuration

Figure 8:
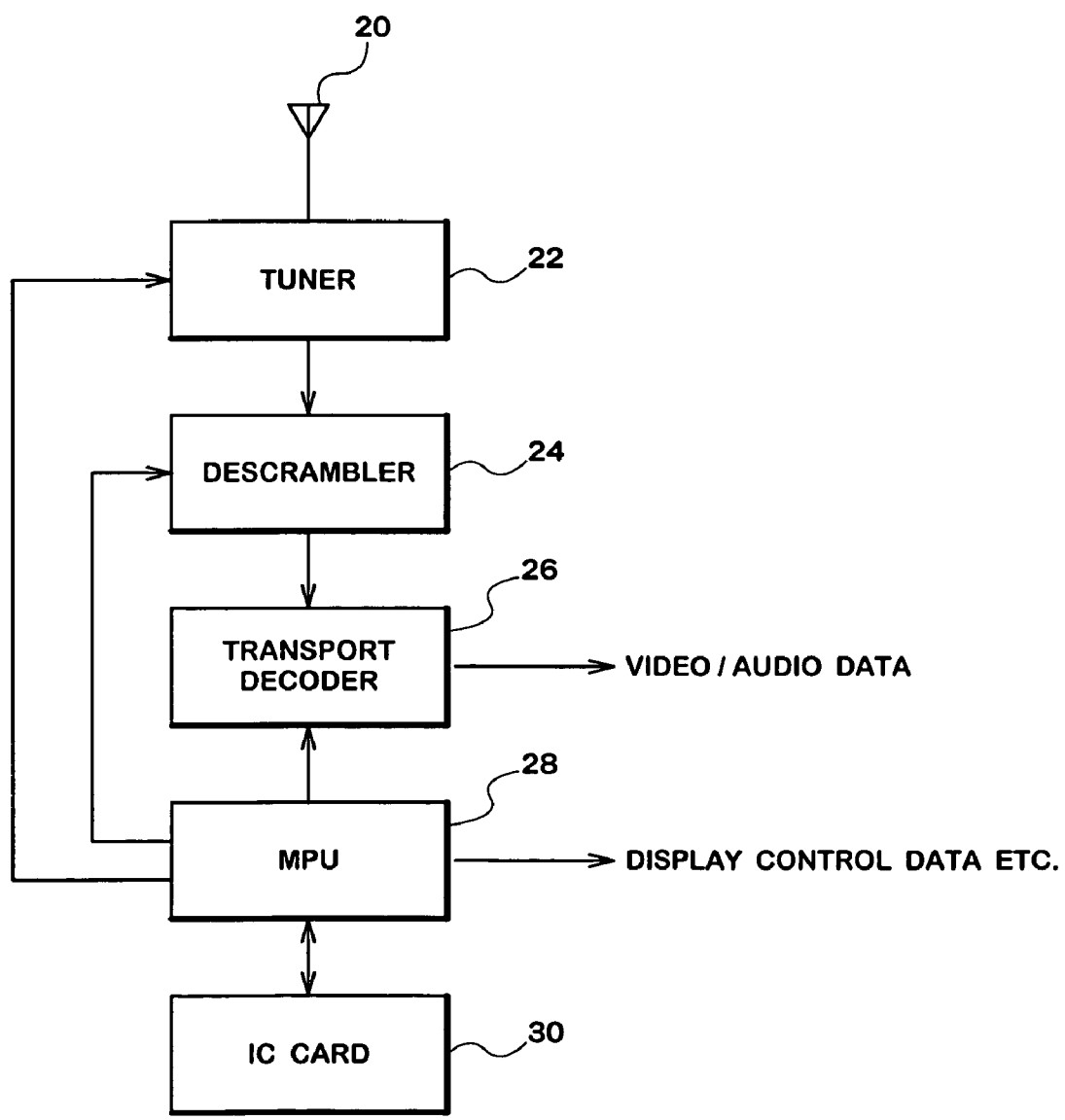
FIG. 8 is a diagram of a common configuration for a receiver unit.

An overview of a receiver unit is diagrammed in FIG. 8. A transport stream is selected by a tuner 22, scrambling is undone by a descrambler 24, and video/audio data ES for a desired service are separated by a transport decoder 26. A microprocessor (MPU) 28 sends the ECM obtained to an IC card 30, and a scrambling key restored by the IC card 30 is received. The MPU 28 sets this scrambling key in the descrambler 24. Thus the video/audio data ES can be descrambled.

The MPU 28 also sets the PID for the video/audio data ES of the desired service in the transport decoder 26. Thus the transport decoder 26 outputs the video/audio data ES for that service. Also, when the PID of control data are set in the transport decoder 26, the separated control data are sent to the MPU 28.

Assuming now that the service SV33 of the transport stream TS3 is being received, the operation is now described for the case where a command to change over to the service SV12 of the transport stream TS1 has been sent to the MPU 28. First, the MPU 28 controls the transport decoder (that is, sets the PID for the control data NIT), and fetches the NIT. By what is written in this NIT, it is learned that the service SV12 for which reception is desired is being multiplexed in the transport stream TS1 (cf. FIG. 7).

The MPU 28 controls the tuner 8 so that the tuner 8 receives the transport stream TS1. The MPU 28 controls the transport decoder 26, so as to obtain the PAT and PMT2 are fetched. The MPU 28 obtains the PIDs for the video data ES(V)2 and audio data ES(A)2 for the desired service SV12 and the ECM PID.

The MPU28 sets these PIDs in the transport decoder 26 so that the video data ES(V)2 and audio data ES(A)2 for the desired service SV12 are output from the transport decoder 26. In parallel thereto, furthermore, the MPU 28 sends the ECM data obtained from the transport decoder 26 to the IC card 30 to fetch the scrambling key, and sets that in the descrambler 24. Thus the MPU 28 obtains the unscrambled video data ES(V)2 and audio data ES(A)2. Received services are switched over in the manner described in the foregoing.

When a command is sent to the MPU 28 to display the program schedule and program information, the MPU 28 controls the transport decoder 26 so as to fetch the EIT data. The MPU 28 outputs command to display the program information, etc. based on the fetched EIT data.

2. Bidirectional Transceiving System 1

A bidirectional transceiving system 1 that is one embodiment of the present invention is now described.

2.1 OVERVIEW

Figure 9:
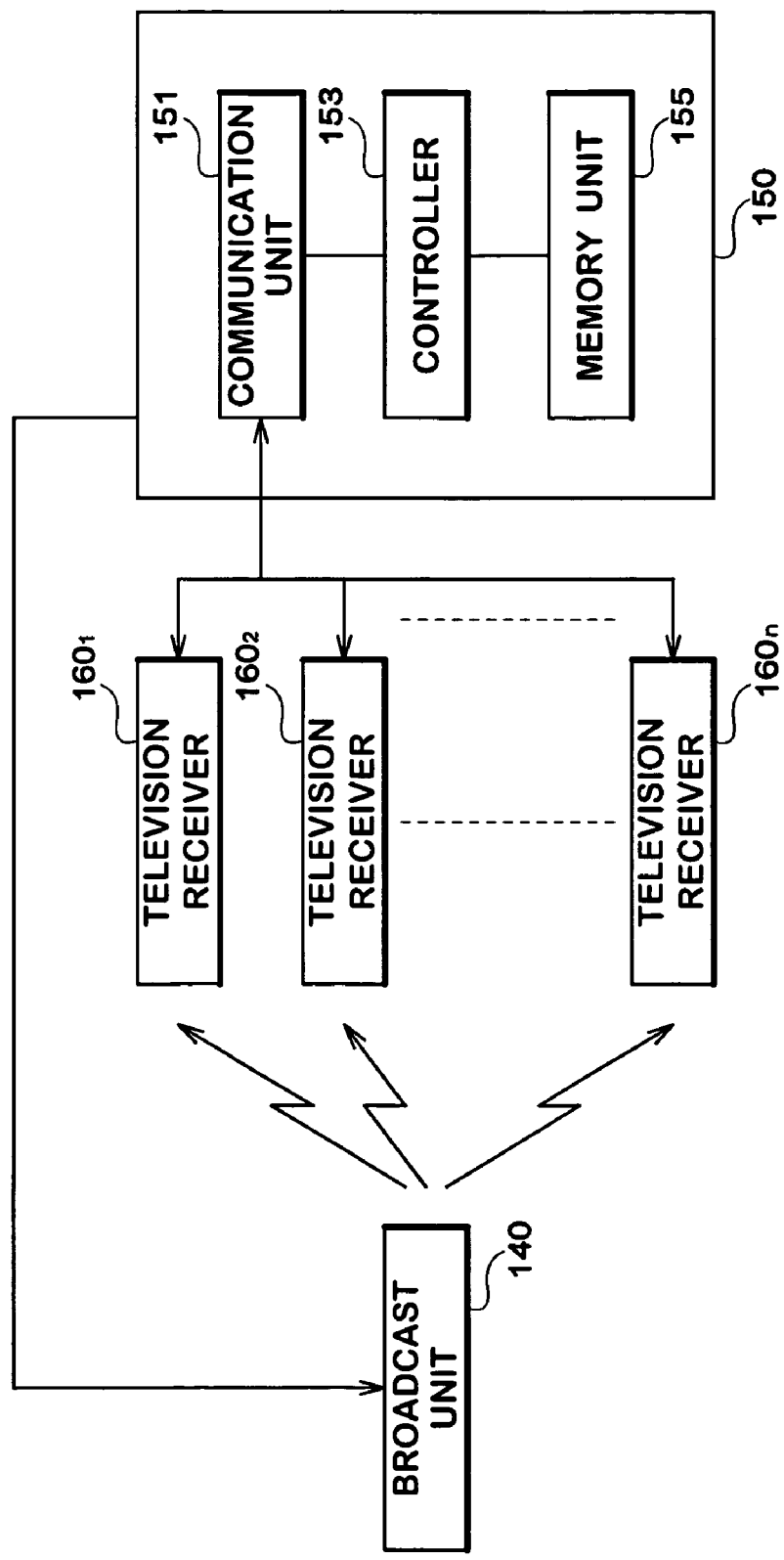
FIG. 9 is an overall configuration diagram of a bidirectional transceiving system according to the present invention.

The overall configuration of the bidirectional transceiving system 1 according to this embodiment of the present invention is diagrammed in FIG. 9.

A broadcasting unit 140 broadcasts such digital data as video and audio. When that is being done, retrial information corresponding to the allowed volume on the communication line between the response information receiving equipment 150 and television receivers $160_1$ to $160n$ are included in these digital data and broadcast.

The television receivers $160_1$ to $160n$ receive the digital data noted above. The television receivers $160_1$ to $160n$ perform display based on the received digital data. When a user views a displayed image, and inputs response information, the television receivers $160_1$ to $160n$ transmit that response information over the communication line to the response information receiving equipment 150.

The response information receiving equipment 150 can be connected by communication lines to the television receivers $160_1$ to $160n$ and thus receive response information from the television receivers.

When communications are not established with the response information receiving equipment 150, the television receivers $160_1$ to $160n$ retrial-transmit the response information on the bases of the retrial information received from the broadcast unit 140. Thus, even when responses to the response information receiving equipment from the television receivers $160_1$ to $160n$ are concentrated, retrial transmissions are made based on the response information corresponding to the allowable volume on the communication lines. Accordingly, response information can be received with greater certainty even when at first no connection could be made with the response information receiving equipment 150. In addition, retrial transmission processing corresponding to the allowable volume on the communication lines can be controlled by the retrial information transmitted from the broadcast unit 140.

2.2 DETAILED DESCRIPTION

The configuration of the broadcast unit 140 is the same as the broadcast unit diagrammed in FIG. 2 except for the generation of navigation data (described below), and so is not further described here. As diagrammed in FIG. 9, the response information receiving equipment 150 has a communication unit 151, controller 153, and memory unit 155. The communication unit 151 is capable of sending and receiving data between the television receivers $160_1$ to $160n$ over telephone lines as communication lines. The controller 153 controls the communication unit 151 and manages data received. The memory unit 155 stores response information received by the communication unit 151.

The television receiver 160$_1$ is now described with reference to FIG. 10. The television receiver 160$_1$ has receiving means 161, display data output means 163, input means 165, communication means 167, detection means 171, retrial condition alteration means 173, memory means 175, edit means 177, and display means 179.

The receiving means 161 receive digital data transmitted from the broadcast unit 140 indicated in FIG. 9. The display data output means 163 output display data based on the digital data received to the display means 179. The display means 179 perform display based on the display data. The user inputs response information to the input means 165 based on that display.

The communication means 167, when communication cannot be made with the response information receiving equipment 150, compute retrial time specifying data that specifies a retrial time, based on the retrial information and, when that retrial time is reached, retransmits the response information stored in the memory means 175. That is, in cases where communication cannot be established with the response information receiving equipment 150 concurrently with the communication of the response information over a communication line, the response information is retrial-transmitted, based on the retrial information sent from the broadcast unit 140.

Thus, even in cases where the response information is transmitted after a delay, response information can be transmitted with certainty by the response information receiving equipment. Moreover, the retrial transmission processing in the television receiver 160$_1$ can be controlled by the digital data broadcast from the broadcast unit 140.

The detection means 171 detect causes why communication is not established with the response information receiving equipment 150. The retrial condition alteration means 173, based on the cause so detected, alter the conditions of retrial transmission from the next retrial. Thus flexible retrial transmissions can be made according to the cause of failure.

The display data output means 163, when a read instruction is sent from a user, outputs the response information input to the display means 179. The edit means 177 edit the edit instructions sent from a user and edit the response information stored in the memory means 175.

In this embodiment, by making a display on the display means 179, the configuration facilitates notification of causes for the non-establishment of communications, wherefore the display data correspond to notification data. This poses no limitation, however, and this information may be notified by another method such as audio, for example. In that case, the audio data correspond to the notification data.

The configuration may also be such that notification is made of the results of communications with the response information receiving equipment noted earlier. In that way, the user can be informed of response results based on delayed transmissions.

The television receivers 160$_2$ to 160$n$ are the same as the television receiver 160$_1$.

The response information stored in the memory means 175 does not consist only of that which has been input, but may be information generated by response information generation means based on received reception data.

2.3 TRANSMISSION DATA

Figure 11:
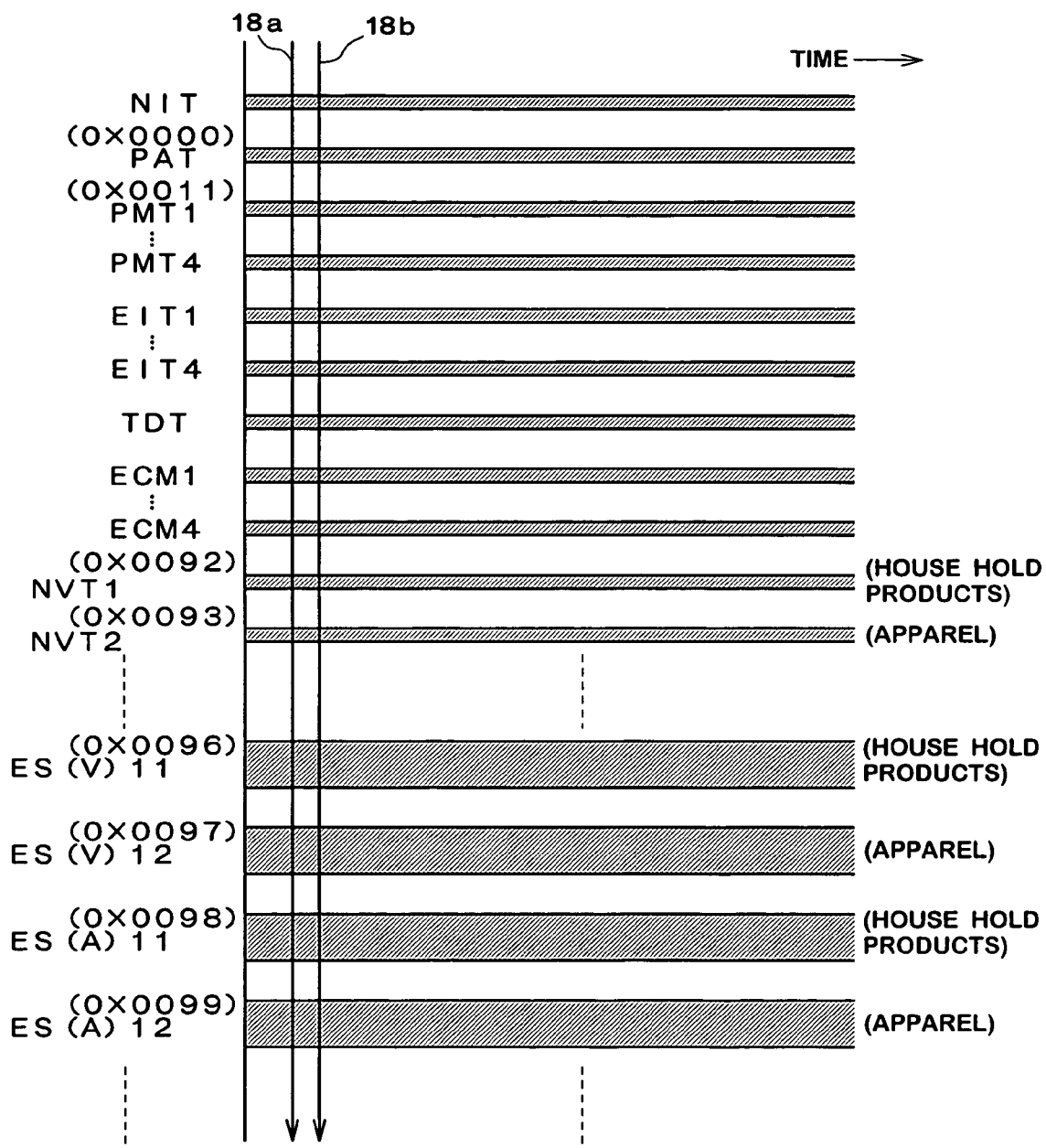
FIG. 11 is a diagram representing a transmitted transport stream.

In a broadcast system that supports interactive operations, the data structure in the transport stream sent from the transmitter unit is as diagrammed in FIG. 11. In FIG. 11, nothing is indicated about video or audio elementary streams of any service other than the service SV11. The service SV11 is configured of a first video elementary stream ES(V)11, a second video elementary stream ES(V)12, a first audio elementary stream ES(A)11, and a second audio elementary stream ES(A)12. Thus, at the point where two types of video/audio ES are contained in one service SV11, the data structure differs from that diagrammed in FIG. 3. The configuration is made such that these two types of video/audio ES can be interactively switched between in response to the input of a user on the receiving end, based on navigation data NVT1 and NVT2 which are interactive control data. The configuration also permits additional displays to be interactively altered by input from a user on the receiving end, based on the navigation data.

In FIG. 12 is diagrammed the content of PMT1 for the service SV11. To the control data PMT1 are written PIDs for all the contents (video, audio, navigation data), and a PID for ECM data for obtaining a key to unscramble those contents. In addition, the video, audio, and navigation data all contain multiple contents, wherefore that which is to be output first is written as the entry contents. The PID for these control data PMT1 themselves is "0x0011."

In FIG. 13 is diagrammed the content of the control data PAT. To the control data PAT are written PIDs for PMTs of the services SV11, SV12, SV13, and SV14 multiplexed in this transport stream TS1. Thus it can be known that the PID for the service SV11 is "0x0011." The control data PAT is obtained by receiving the packet attached PID "0x0000" because the PID of the control data PAT is fixedly determined as "0x0000".

The content written in the navigation data NVT1 and NVT2 is diagrammed in FIG. 14 and FIG. 15. With this one set of navigation data NVT1 and NVT2 the same content is repeatedly sent. By means of these navigation data NVT1 and NVT2, as will be described later, service content can be switched between interactively by input from a user.

2.4 CONCRETE CONFIGURATION EXAMPLE FOR AND OPERATION OF RECEIVER

Figure 10:
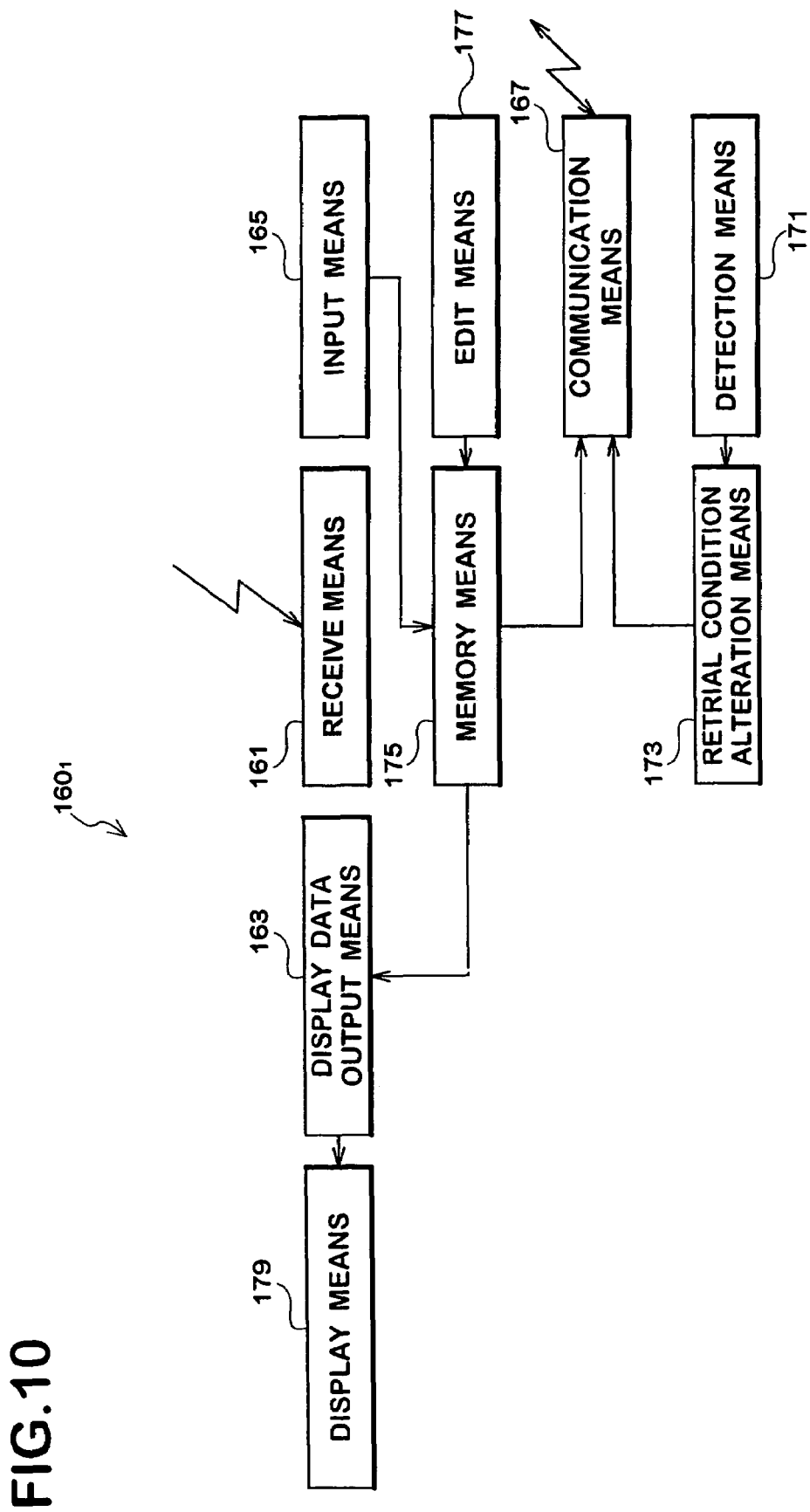
FIG. 10 is a detailed functional block diagram for the receiver shown in FIG. 9.
Figure 16:
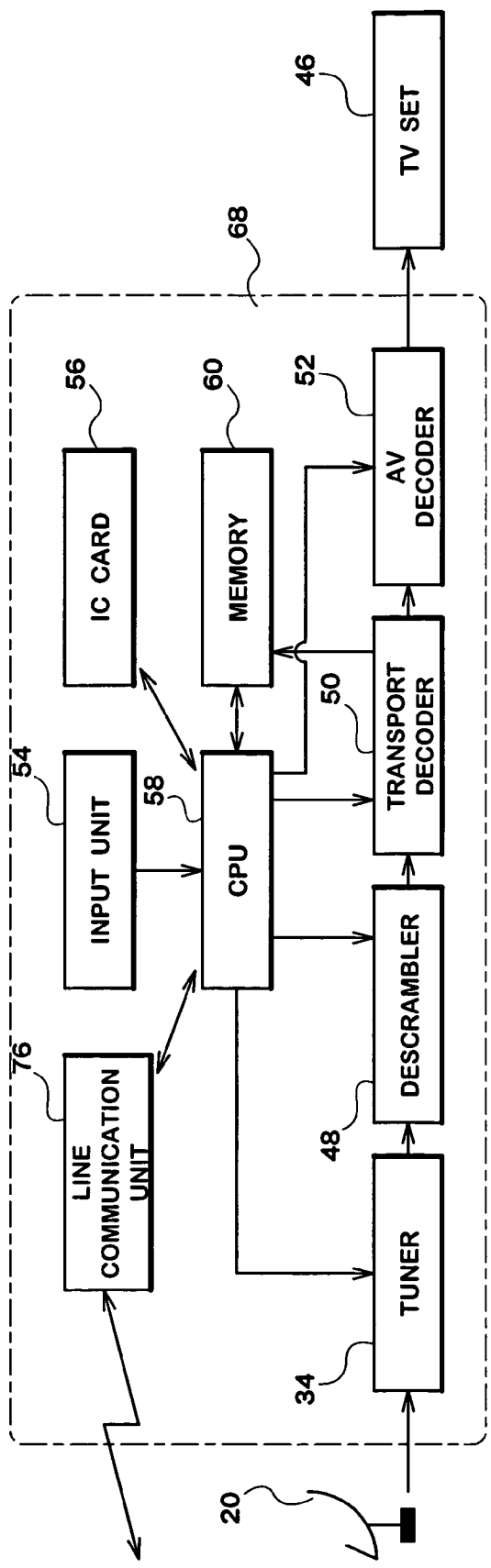
FIG. 16 is a diagram of a hardware configuration in a receiver.

In FIG. 16 is diagrammed a hardware configuration diagram for a case where the receiver 160$_1$ diagrammed in FIG. 10 is implemented with a CPU. In addition to functioning as an ordinary satellite broadcast receiver, this receiver 160$_1$ has functions also for transmitting response information input by a user to a center. These functions are implemented by a CPU 58 and a program stored in a memory 60. That program may be a program that functions by itself, or one that functions assuming the presence of an operating system (Windows CE made by Microsoft, etc.).

The CPU 58 controls the components according to the program stored in the memory 60.

It is here assumed that the transport stream diagrammed in FIG. 11 is being sent. It is further assumed that the service SV11 contains the video data ES(V)11 and ES(V)12 and the audio data ES(A)11 and ES(A)12, that the video data ES(V)11 and audio data ES(A)12 are television shopping content pertaining to household products, and that the video data ES(V)12 and audio data ES(A)12 are television shopping content pertaining to apparel.

The reception processing program stored in the memory 60 is now described with reference to the flowchart given in FIG. 18.

Assuming that the service SV13 in the transport stream TS1 is being received, the operation involved in sending an instruction to the CPU 58 to switch over to the service SV11 in the transport stream TS1 is described. Instructions are sent to the CPU 58 from a control panel or control remote. The input unit 54 indicated in FIG. 16 is an optical receiver that accepts instructions from the control panel or control remote.

The CPU 58 sets a PID of the control data PAT in a control data separation register (not shown) in a transport decoder (hereinafter referred to as TS decoder) 50. The PID of the control data PAT is fixedly determined as "0x0000." Thus the TS decoder 50 records the content of the separated PAT in the memory 60 (step S11). In this PAT are written a list of the services that are multiplexed in the transport stream TS1 currently being received (cf. FIG. 13). Accordingly, the CPU 58 knows that the desired service SV11 is multiplexed in the transport stream TS1 currently being received. That is, the CPU 58 advances the processing from step S12 to step S18.

In step S18, based on the fetched the control data PAT, the PID of the control data PMT of the desired service SV11 is fetched. Here, "0x0011" is fetched (cf. FIG. 13). Next, the CPU 58 sets the PID "0x0011" in the control data separation register in the TS decoder 50. Thus the PMT1 of the service SV11 is separated, and the content thereof can be fetched into the memory 60 (step S19).

The PMT1 for the service SV11 is diagrammed in FIG. 12. The CPU 58, based on this PMT1, determines whether or not navigation data NVT is contained in the service SV11 (that is, whether or not this is an interactive service) (step S191). When no NVT are contained, the CPU 58 fetches the PID "0x21" of the ECM data for obtaining the descrambling key for the video and audio data, based on this PMT1. Similarly, it fetches the PIDs "0x22" and "0x24" for the video and audio data ES(V)1 and ES(A)1 (step S20).

The CPU 58 sets the ECM PID "0x21" in the control data separation register in the TS decoder 50 so as to fetche the ECM. It also sends this ECM data to the IC card 56 so as to fetche the restored scrambling key. The scrambling key fetched in this manner is set in the descrambler 48 (step S21). Thus the video data ES(V)1 and audio data ES(A)1 of the service SV11 are rendered in an unscrambled state.

Further, the CPU 58 sets the PIDs "0x22" and "0x24" for the video and audio data ES(V)1 and ES(A)1 in an ES separation register (not shown) in the TS decoder 50 (step S22). Thus the TS decoder 50 outputs the separated video and audio data ES(V)1 and ES(A)1 to an AV decoder 52.

The AV decoder 52, upon receiving these data, expands (restores) the compressed data, performs D/A conversion, and generates a video composite signal. This signal is sent to a TV set 46 and output as video and audio.

On the other hand, when, in step S191, that service contains navigation data, as diagrammed in FIG. 12, the CPU 58 recognizes, from the content of PMT1, the PIDs for the video, audio, and navigation data that are the entry contents, and the PID for that ECM data (step S192). The data recognized here are the PID "0x0096" for the video data ES(V)11, the PID "0x0098" for the audio data ES(A)11, the PID "0x0092" for the navigation data NVT1, and the PID "0x0082" for these ECM data.

The CPU 58 sets the PID "0x0082" in the control data separation register in the TS decoder 50 so as to fetche the ECM data. The ECM data are also sent to the IC card 56 so as to fetch a scrambling key restored by the IC card 56. In this manner the fetched scrambling key is set in the descrambler 48 (step S193). Thus the service SV11 video data ES(V)11 and ES(V)12, audio data ES(A)11 and ES(A)12, and navigation data NVT1 and NVT2 packets are rendered in an unscrambled state.

The CPU 58 alters the TS decoder 50 filtering conditions, and also interprets and executes the content of the navigation data selected by the TS decoder 50 (step S194). A detailed flowchart for step S194 is described with reference to FIG. 19.

The CPU 58 sets the PIDs "0x0096" and "0x0098" for the video and audio data ES(V)11 and ES(A)11 in the ES separation register (not shown) in the TS decoder 50, and sets the PID "0x0092" for the navigation data NVT1 in the control data separation register (not shown) in the TS decoder 50.

Figure 21:
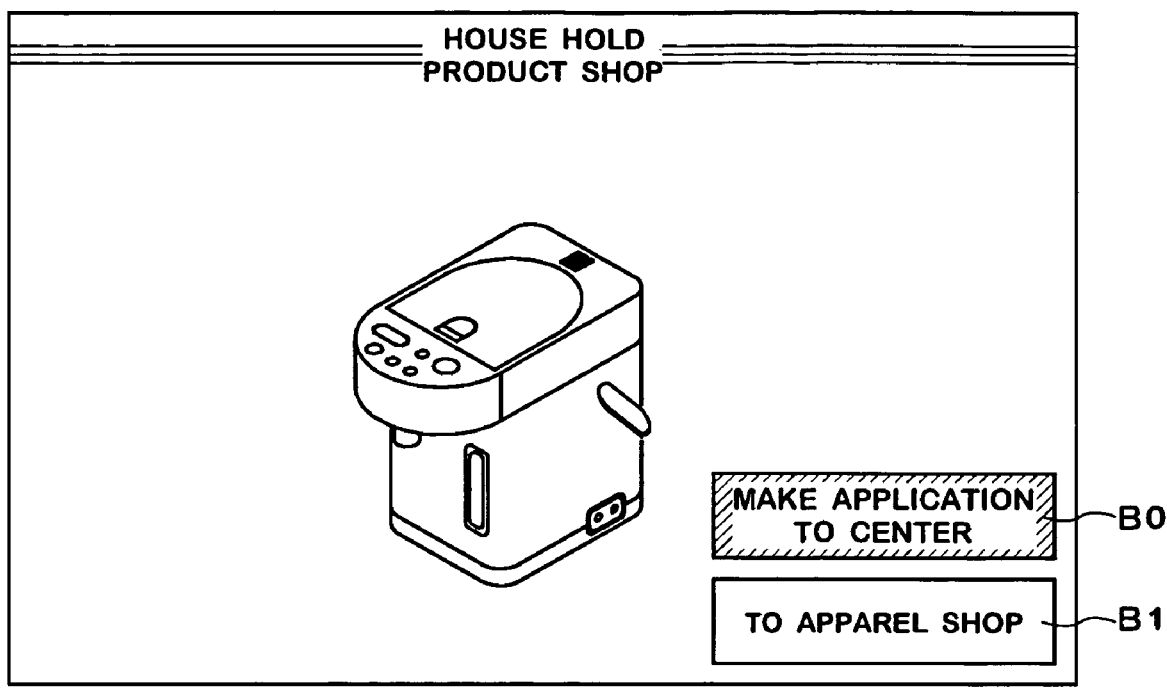
FIG. 21 is a diagram representing a household product television shopping screen displayed on a TV set 46.

Thus the TS decoder 50 outputs the separated video and audio data ES(V)11 and ES(A)11 to the AV decoder 52. The AV decoder, having received those data, expands (restores) the compressed data, performs D/A conversion, and generates a video composite signal. This signal is sent to the TV set 46 and output as video and audio. It is assumed here that moving images of household products television shopping, such as diagrammed in FIG. 21, are displayed. Also, the buttons B0 and B1 at the lower right corner of the screen are displayed by the navigation data described later, and are not contained in the video and audio data ES(V)11 and ES(A)11.

The CPU 58, when it receives the navigation data NVT1 from the TS decoder 50, temporarily records those data in the memory 60, and interprets and executes those navigation data NVT1. It is assumed here that navigation data NVT1 such as diagrammed in FIG. 14 have been fetched.

Figure 17:
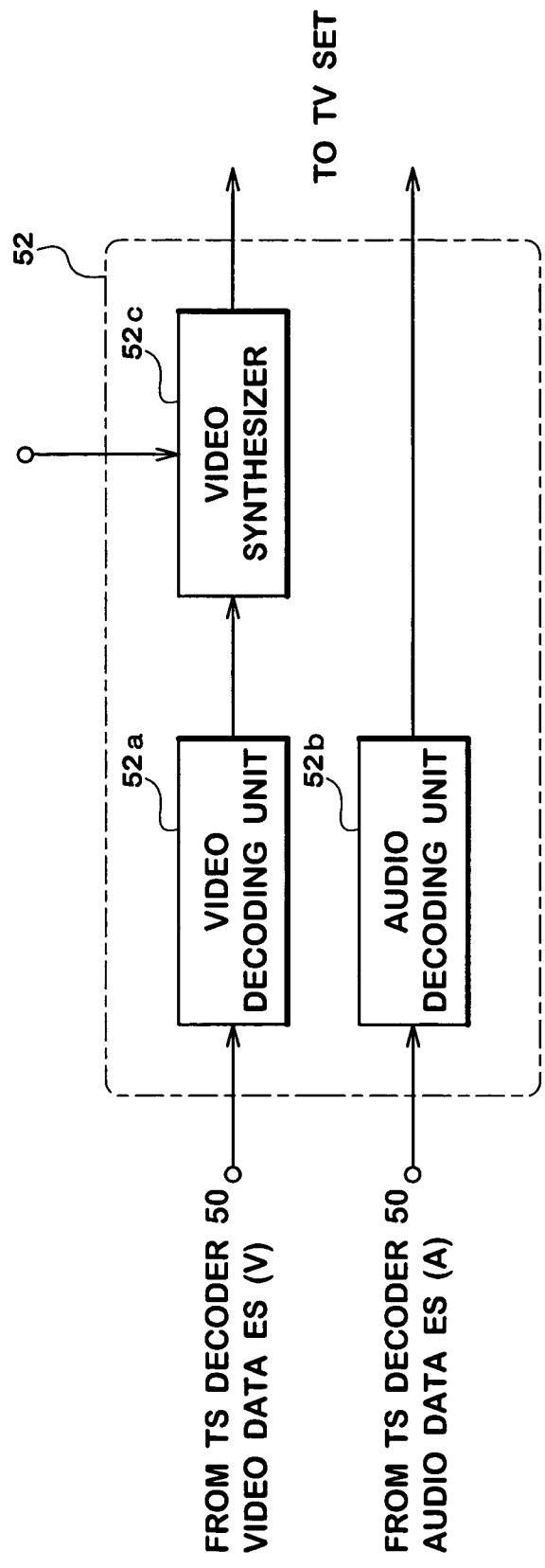
FIG. 17 is a detailed diagram of an AV decoder 52.

The CPU 58, from the object table in the navigation data NVT1 diagrammed in FIG. 14, sets the object index number "0" as an attention index object (step S202). The CPU 58 displays in the focus mode for the attention index, and a normal mode bit map data for other indexes (step S204). More specifically, because the attention index object is the index "0," control is effected so that data having the bitmap index number "1" are displayed in the focus mode for the index "0" in the object table, while data having the bitmap index number "2" are displayed in the normal mode for the index "1" in the object table. That is, these data are sent respectively to a video synthesizer 52c (cf. FIG. 17) in the AV decoder 52 so that, for the index "0" in the object table, data having the bitmap index number "1" (highlighted display of "send application to center") are displayed at the position having an X coordinate of "500" and a Y coordinate of "200," and for the index "1" in the object table, the data having the bitmap index number "2" (non-highlighted display of "to apparel shop") are displayed at the position having an X coordinate of "500" and a Y coordinate of "400." Thus the video synthesizer 52c generates video data wherein a highlighted display of "send application to center" and a non-highlighted display of "to apparel shop" are superimposed on the video data ES(V)11. When this is done, a display like that diagrammed in FIG. 21 is obtained wherein the buttons B0 and B1 are superimposed on moving images describing products. As is clear from the screen, a condition is displayed wherein the button B0 "send application to center" has been selected.

Figure 20:
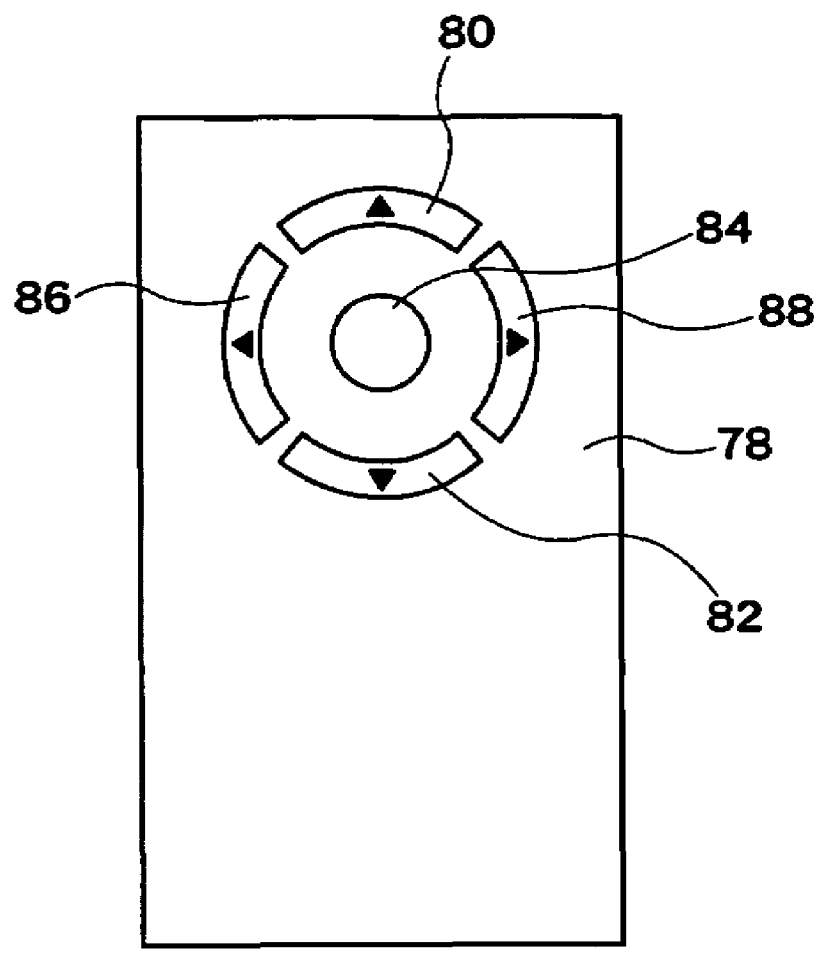
FIG. 20 is a diagram of an external view of a remote control apparatus 78.

The CPU 58 determines whether or not a key input has been made (step S206). When a key input has been made, the CPU 58 determines the type of key input (step S208). In this embodiment, the configuration is made so that a determination is made as to whether a cursor moving key or decision key on the remote 78 diagrammed in FIG. 20 (or on the control panel on the main unit) has been input. This key type is determined by notification from the input unit 54 (cf. FIG. 16).

When the key input is a cursor moving key, the CPU 58 alters the attention index according to that control (step S210), and performs the display routine in step S204. If the key input is the "key that moves the cursor down," then step S205 is advanced to, the bitmap index in the focus mode for the attention index according to the user control is displayed, and the screen display status is one wherein the button B1 "to apparel shop" has been selected.

In the embodiment described in the foregoing, only those controls with the up and down cursor keys 80 and 82 are indicated. However, if the object index is made in a two-dimensional array, control can also be implemented that supports the left and right keys 86 and 88.

Figure 19:
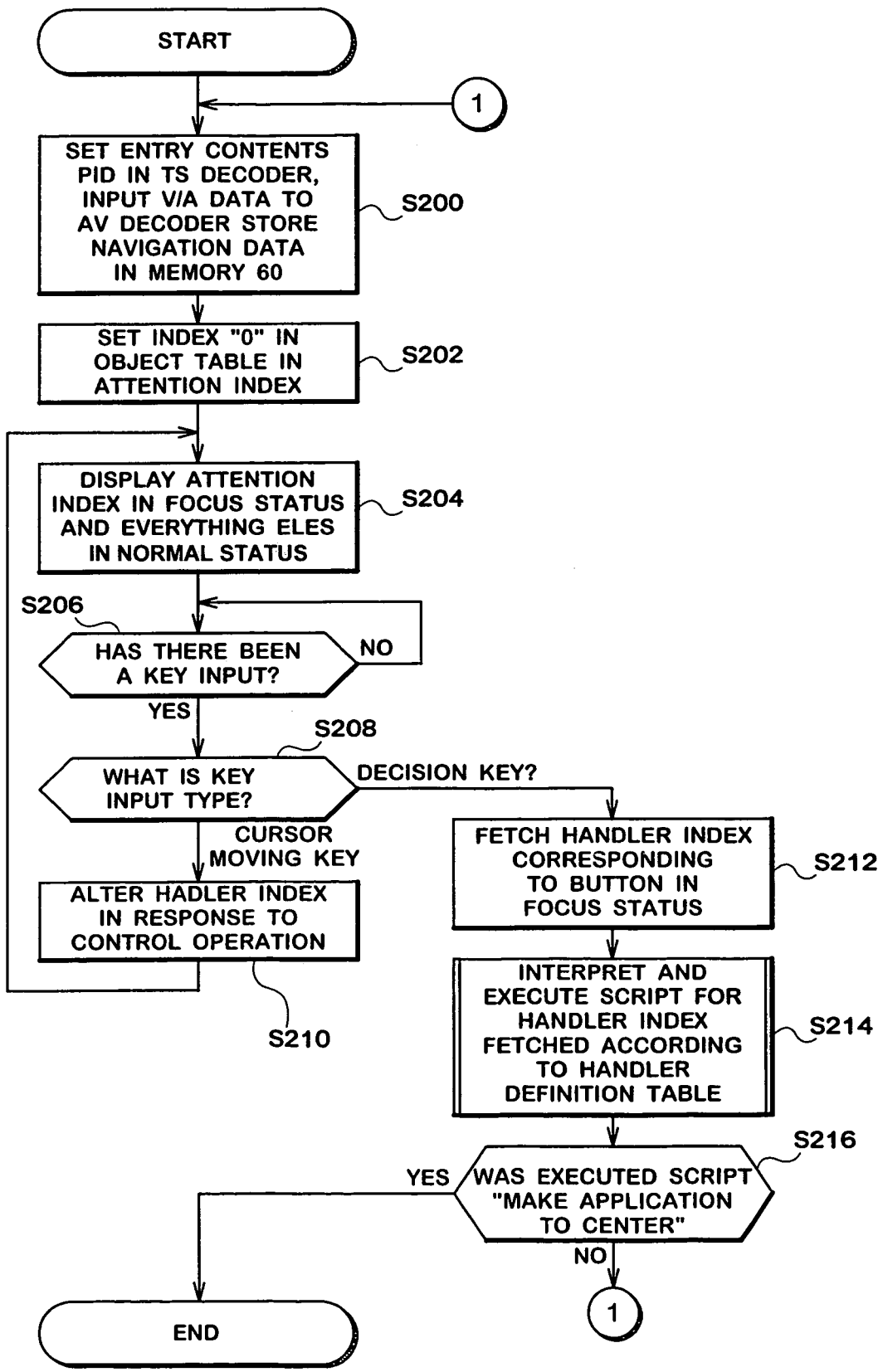
FIG. 19 is a flowchart for a program that interprets and executes navigation data.
Figure 22:
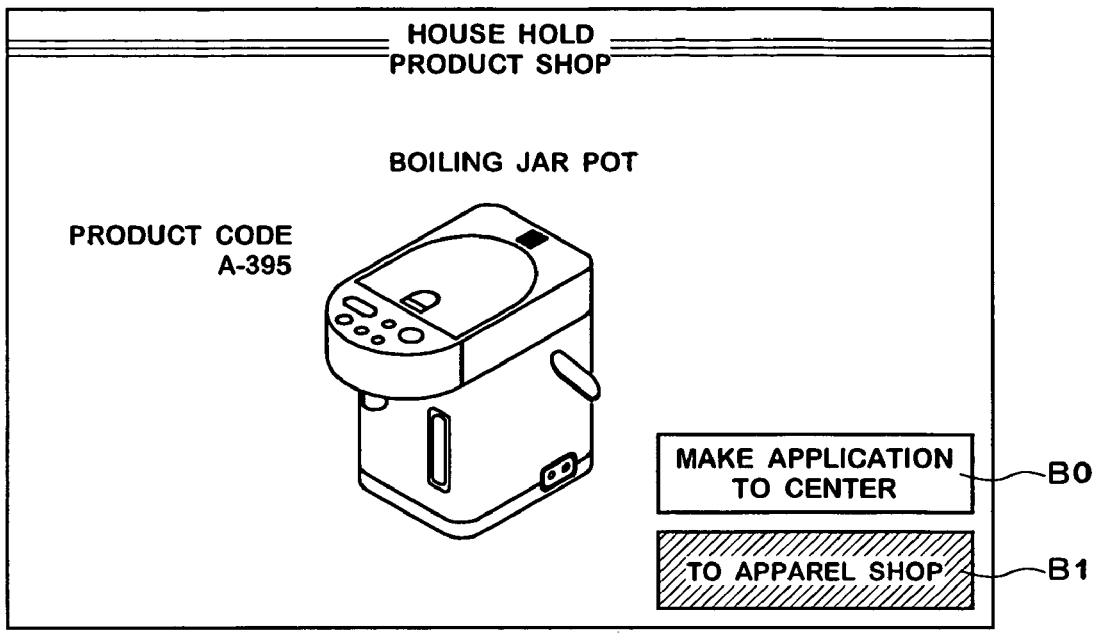
FIG. 22 is a diagram representing a household product television shopping screen displayed on the TV set 46.

In the condition diagrammed in FIG. 22, when the decision button 84 on the remote 78 is pressed, the CPU 58 advances from step S208 in FIG. 19 to the processing based on step S212. In step S212, the CPU 58 references the navigation data NVT1, and fetches a handler index written in the handler column in the object index currently in the selected condition. Here, the object index "1" has been selected, so the handler index "1" in the handler column is fetched.

In addition, a handler definition table is referenced, and a script corresponding to the handler index "1" is fetched and executed (step S214). Here, "go to contents (index 1)" is fetched. The script "go to contents( )" is an instruction to switch to contents having the index number inside the parentheses ( ) indicated in a hyperlink table. Accordingly, a switchover is effected to the contents having the hyperlink index "1" (apparel television shopping) indicated in the hyperlink table.

To the hyper index "1" in the hyperlink table are written the PIDs "0x0097," "0x0099," and "0x0093" for the video, audio, and navigation data, respectively, that are links. The CPU 58 sets the PIDs "0x0097" and "0x0099" in the ES separation register in the TS decoder 50, and sets the PID "0x0093" in the control data separation register therein.

Thus the video data ES(V)12 and audio data ES(A)12 are output to the AV decoder from the TS decoder 50. Thereby, the TV set 46 displays moving images for apparel television shipping as diagrammed in FIG. 23, and outputs audio therefor.

Also, the navigation data NVT2 diagrammed in FIG. 15, is separated by the TS decoder 50, and recorded in the memory 60 in place of the navigation data NVT1. The processing diagrammed in FIG. 19 is executed for these navigation data NVT2, and the buttons B10 and B12 are displayed as diagrammed in FIG. 23.

Figure 23:
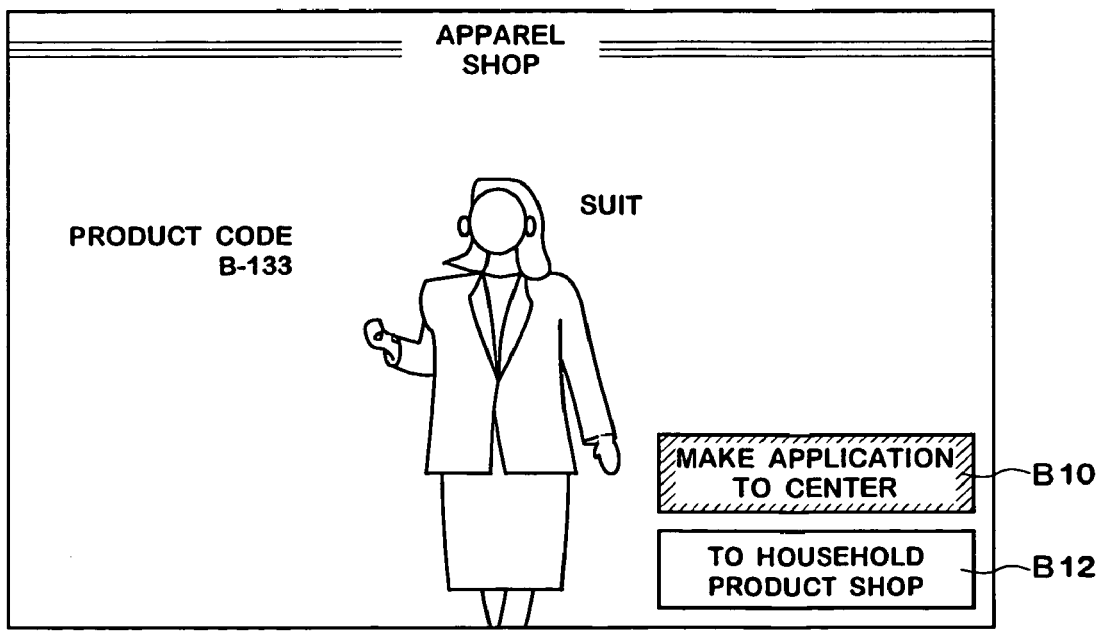
FIG. 23 is a diagram representing an apparel product television shopping screen displayed on the TV set 46.

In the condition wherein the "send application to center" button B10 has been selected as in FIG. 23, when the user depresses the decision button 84 (cf. FIG. 38), it is possible to make application to purchase products. This process is now described.

When the decision button 84 is depressed, the CPU 58 advances the processing from step S208 to step S212. In step S212, a handler index data is fetched from the index handler column currently in the selected state, following the object display of navigation data NVT2 (cf. FIG. 15). Here, the object index "0" is in the selected state, wherefore the handler index "0" is fetched.

The CPU 58 executes a script corresponding to the handler index "0" in the handler definition table. That is, the script "regist_delayed_connection" is executed. The script "regist_delayed_connection( )" is an instruction to register delayed transmission data based on the arguments inside the parentheses ( ).

Delayed transmission data registration processing is now described. The arguments in the script "regist_delayed_connection( )" indicate, in order from the beginning, "order registration number," "transmitting party telephone number," "product code," "service start time," "initial transmission setting time width," "service end time," and "retrial period."

The CPU 58 generates delayed transmission data based on these arguments. More specifically, while computing the transmission scheduling time, necessary data are recorded as delayed transmission registration information in the memory 60. For the initial transmission scheduling time, it is only necessary to random-number generate a delay time, within the initial transmission setting time width, and add the delay time obtained to the service start time. In this case, for example, the initial transmission setting time width is 2 hours, so a random number is computed within the 0 to 2 hour range, and the transmission scheduling time is found.

The configuration may also be such that the initial transmission scheduling time is recorded directly in the navigation data NVT1.

In FIG. 24, the delayed transmission registration information generated by this process is tabulated. In FIG. 24, two sets of delayed transmission registration information generated by navigation data NVT1 and navigation data NVT2 are stored.

When the processing in step S214 is complete, the CPU 58 determines whether or not the executed script was the script regist_delayed_connection( ) (step S216). If the executed script was not the script regist_delayed_connection( ), then, in that case, it is a contents-switching script, wherefore the processing in step S200 and following is repeated. If, on the other hand, the executed script was the script regist_delayed_connection( ), then, in that case, the processing diagrammed in FIG. 19 ends.

Thus the reception processing ends.

2.5 DELAYED TRANSMISSION PROCESSING

The delayed transmission processing adopted in this embodiment is now described with reference to FIG. 25 and FIG. 26. The description here assumes that the delayed transmission registration information diagrammed in FIG. 24 is stored in the memory 60.

Figure 25:
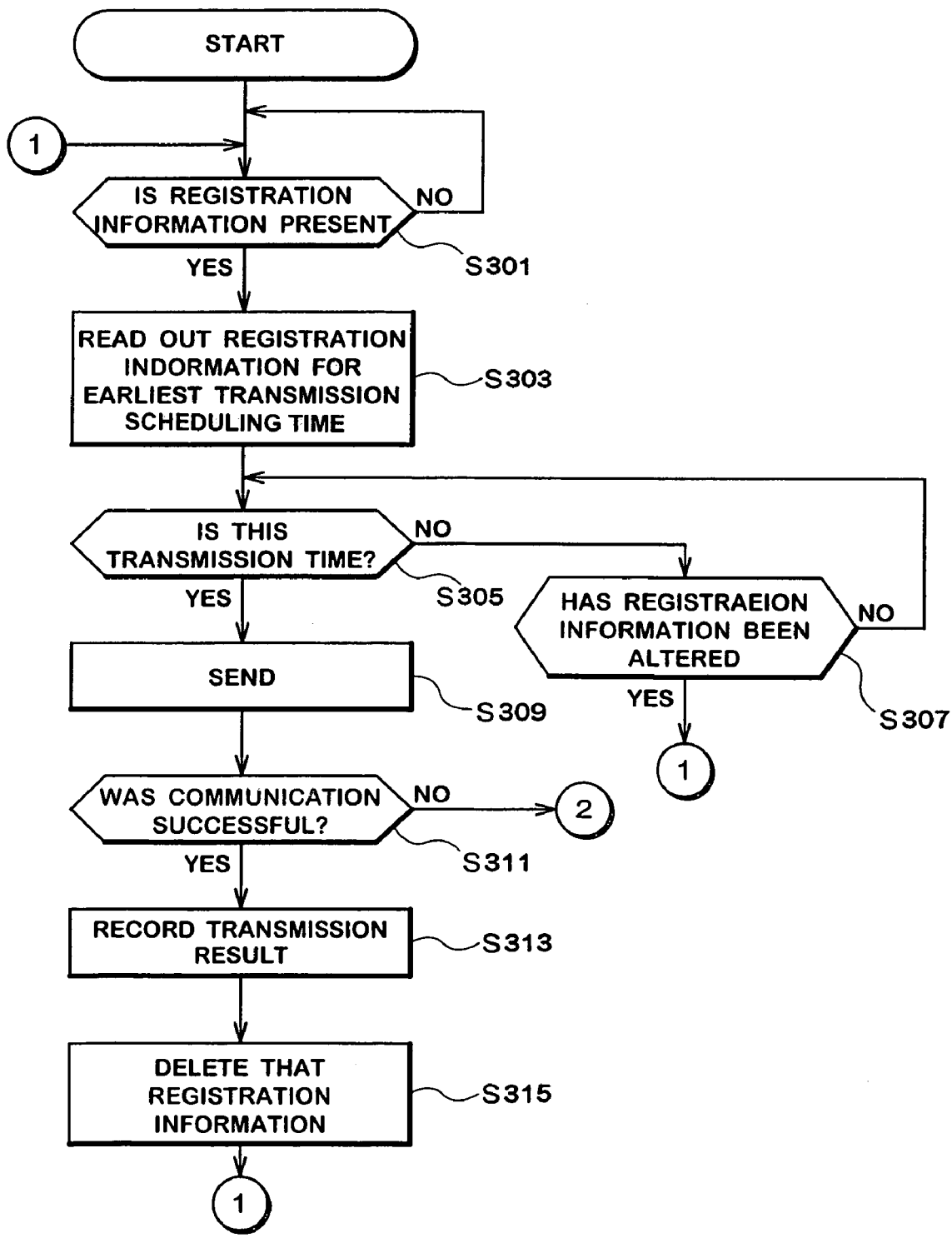
FIG. 25 is a delayed transmission registration processing flowchart.

The CPU 58 determines whether or not there is registration information in the delayed transmission registration information table in the memory 60 (step S301 in FIG. 25). In this case, there is registration information in the delayed transmission registration information table, so the delayed transmission registration information having the earliest transmission scheduling time is read out (step S303). In this case, the delayed transmission registration information having the order registration number "007" is earlier than that having the order registration number "001," so the delayed transmission information having the order registration number 007 is read out. More specifically, the order registration number "007," the transmitting party telephone number "06-6900-xxxx," the product code "B-133," the transmission scheduling time "1999.1.10.13:30:00," the service end time "1999.10.16:00:00," and the retrial period "10 minutes" are read out from the memory 60.

The CPU 58 determines whether or not the current time coincides with the transmission scheduling time "1999.1.10.13:30:00" (step S305). If the current time does not coincide with the transmission scheduling time, a determination is made as to whether or not there has been any change in the registration information in the delayed transmission registration information (step S307). If there has been no change in the registration information, then the decision routine in step S305 is repeated. If, however, there has been a change in the registration information, step S301 is returned to, and a decision is made as to whether or not the registration information is present.

When in step S305 the current time does coincide with the transmission scheduling time, the registration information in view is transmitted according to the communications protocol (step S309). If this is the case, then the transmission is made as follows. The CPU 58 fetches the delayed transmission information having the transmitting party telephone number "06-6900-xxxx," controls the line communication unit 76 indicated in FIG. 16, and calls the number "06-6900-XXXX." This is the telephone number of the television shopping reception center. When the call goes through, the CPU 58 transmits the argument data "product code:B-133" and an ID for specifying the product purchaser. Such a product purchaser ID may be fetched from the IC card 56 or from the memory 60, for example. Thus the order for the product designated by the user is concluded.

The CPU 58 determines whether or not the communication was successful (step S311), and, if successful, records the transmission results ("successful" in this case) in the memory 60 (step S313). The CPU 58 deletes that delayed transmission registration information (step S315), and then repeats the procedures from step S301 on.

Figure 26:
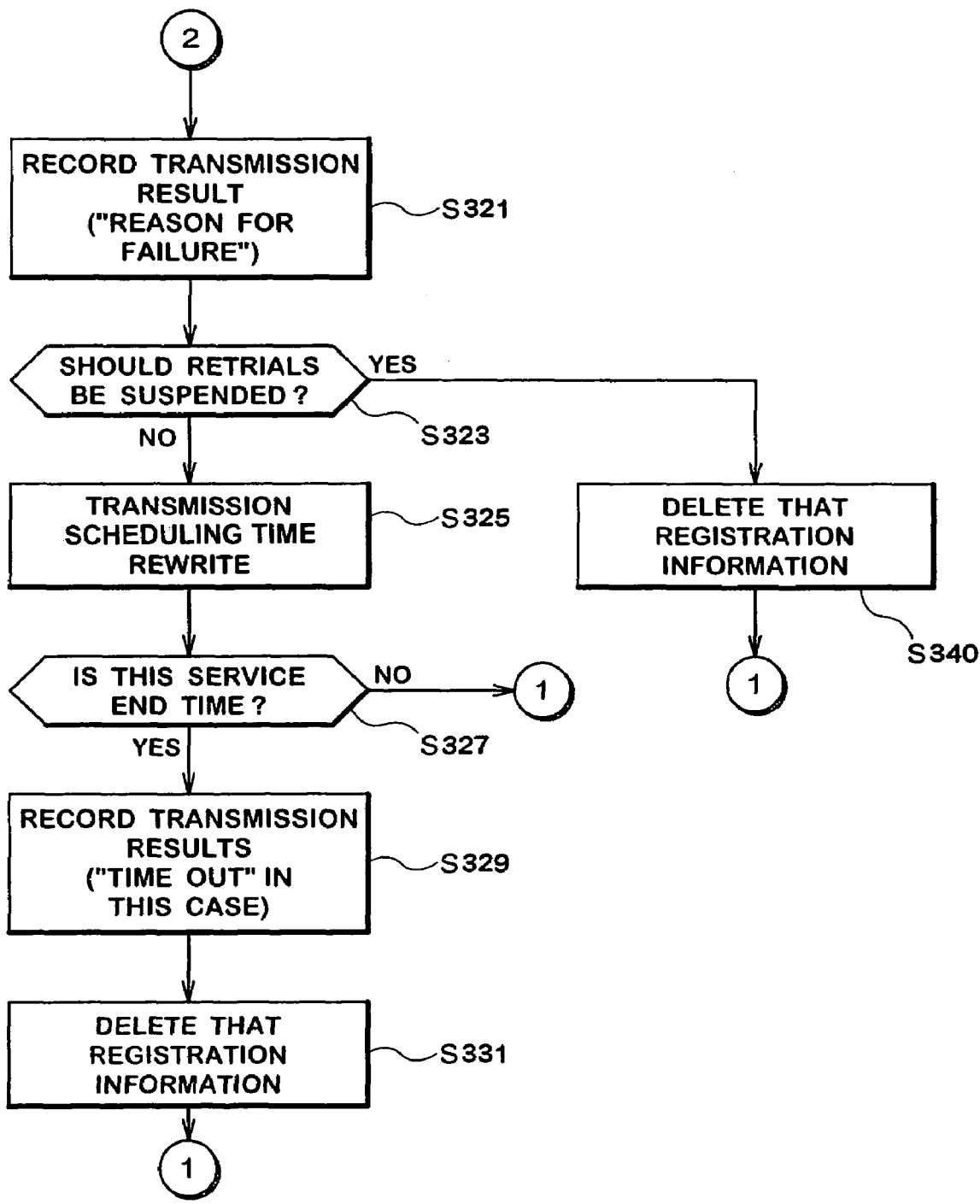
FIG. 26 is a delayed transmission registration processing flowchart.

If, in step S311, the communication was not successful, on the other hand, the CPU 58 records the results of that transmission ("failed" in this case) in the memory 60 (step S321 in FIG. 26). An example of such a case would be where the center telephone was busy.

The CPU 58 determines whether or not retrials should be suspended (step S323). This determination will be described subsequently.

When the CPU 58 has determined that retrials should not be suspended, the transmission scheduling time for the failed order registration number must be rewritten in order to permit automatic retrial (step S325). More specifically, the retrial period is added to the current order scheduling time, and the result is rewritten as a newly computed transmission scheduling time. If this is the case, the new transmission scheduling time becomes "1999.1.10.13:40:00."

The CPU 58 determines whether or not the new transmission scheduling time "1999.1.10.13:40:00" exceeds the service end time (step S327). In this case, the new transmission scheduling time does not exceed the service end time "1999.1.10.16:00:00" indicated in FIG. 24, so the processing is repeated from step S301 on in FIG. 25.

In step S327 in FIG. 26, if the new transmission scheduling time does exceed the service end time, the CPU 58 records the transmission results ("out of time" in this case) (step S329). The CPU 58 also deletes that registration information (step S331).

Thus the processing flowcharted in FIG. 25 and FIG. 26 is repeated.

The transmission results recorded may also, when the order has gone through, for example, be output so that notification thereof can be made. For example, in a case where, in terms of transmission result, the order having the order registration number "007" was not successful prior to the service end time but the order having the order registration number "001" was successful, communication results such as are diagrammed in FIG. 27 are displayed on the TV set 46. In this example, the response information for order registration number 001 is "13:52 busy," "13:57 busy," . . . "14:12 successful," while the response information for order registration number 007 indicates "13:30 busy," "13:40 busy," . . . "16:00 time out."

By displaying such a log as this, the user can learn whether or not an application to purchase a product was processed properly. The times for communications made may be fetched from control data TDT contained in the transport stream, or from an internal calendar or clock, etc., in the CPU itself. Alternatively, the configuration may be made so that the communication results make notification when an order fails as well as when it succeeds. This may be done, for example, by lighting a LED mounted on the main unit or making a display on the monitor in each case. Or these results may be made in summary form. A transmission history of response information may be stored in memory and displayed as a list, for example. Alternatively, the transmission history may be displayed so as to show the response information separately for each order registration number.

2.6 CAUSE DETECTION PROCESSING FOR DELAYED TRANSMISSIONS

The processing in step S323 in FIG. 26 is described next. In this embodiment, if communication processing with the center has not been completed, until the service end time, based on the retrial period sent from the broadcasting station, retrial processing is altered according to the reason why communication cannot be effected with the center, instead of finding the transmission scheduling time and repeating the retrial processing.

In this embodiment, the conditions for suspending retrial processing are stored in memory, and retrial processing which matches the conditions concerning which the failure reason was stored in memory in step S321 is suspended. An example of this is the case where the telephone call with the other party was established but connection could not be made with the other party's modem. In this case, it is possible that the other party's telephone number in the navigation data indicated in FIG. 14 is in error. In such cases, it is unlikely that communication can be established by repeating the retrial processing.

Another case of suspending retrial processing is one where the telephone call to the center does not go through within a prescribed number of retrials, for example. In this case, it is possible that the connector from the receiver to the telephone has been unplugged, whereupon the call will not go through to the center no matter how many retrials are made. In this case, the fact of being unable to get a call through to the other party constitutes an anomalous situation, wherefore retrial processing is suspended. In this case also, moreover, provision may be made for displaying a message to please confirm that the telephone cord has not become disconnected. Provision may also be made so that, after that message is displayed, another retrial will be made after a confirmation button has been depressed.

In this embodiment, delayed transmissions are made, wherefore it is very difficult for a user to know when the transmitter sent the response information. There are also cases where the telephone line described in the foregoing is shared between an ordinary telephone and the receiver. In that case, it is possible that the user is using that telephone line. In that case, when the telephone use by the user has terminated, that may be detected, and a time that is a prescribed number of seconds thereafter (10 seconds later, for example) may be determined as the transmission scheduling time.

2.7 COMPUTATION OF INITIAL SCHEDULED TRANSMISSION TIME

The following procedure may also be used for computing the initial transmission scheduling time described in the foregoing. If a probability density function with time plotted on the horizontal axis and probability density on the vertical axis, as diagrammed in FIG. 28A, is sent from the broadcasting station, then, on the receiving end, based on that function, a random number may be generated to determine the initial transmission scheduling time.

Figure 28A:
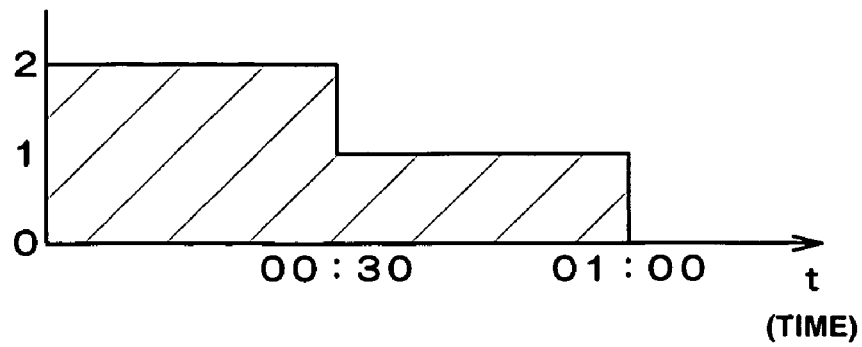
FIGS. 28A, 28B, and 28C are examples of a probability density function.

The probability density function diagrammed in FIG. 28A is a function wherewith the probability density is 2 from start to 30 minutes, and the probability density is 1 from 30 minutes to 1 hour. This function can be defined, for example, as {(00:00:00-00:29:59, 2), (00:30:00-00:59:59, 1)}. Thus, by employing probability variation data wherein the probability density changes as time elapses, the delayed transmission on the receiving end can be definitely controlled by the transmission end. This is so for the following reason.

It is possible to predict the frequency of telephone responses for a given product, to some degree, by an experiential rule of thumb. Ordinarily, the quantity of telephone lines made available at the center is determined in view of such a prediction. For example, 100 lines might be made available from start to 30 minutes, and the number then reduced to 50 lines after 30 minutes have elapsed. Accordingly, the communication lines made available for the response information receiving equipment cannot be effectively used merely by simply delaying and dispersing the responses from the receiving end. However, by sending probability variation data that matches the number of communication lines made available from the sending end, as described above, and determining the initial transmission scheduling time by a random number based thereon, responses will be made with roughly that probability. Thus the communication lines made available in the response information receiving equipment can be used effectively.

A procedure for determining the transmission scheduling time when such a probability density function is used is now described. On the receiving end, a random number is generated as the maximum value for a random number for the area (hatched portion) defined by the function described earlier, and a time corresponding to that value is computed. With the function diagrammed in FIG. 28A, for example, the overall area is

30*60*2+30*60*1=3600+1800=5400.

The *60 factor is included because the time is expressed in seconds.

Figure 28B:
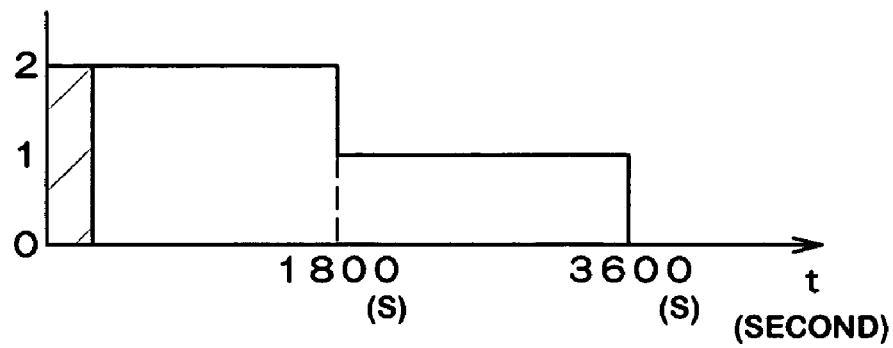

A random number is thus generated having this 5400 as the maximum value of the random number. Then the delay time is computed so that the random number obtained coincides with the area. In this case, the probability density is changed at the 3600 boundary, wherefore, in cases of 3600 or less, such as, for example, when 388 is the random number generated, the transmission will be made after 388/2=194 seconds, that is, after 3 minutes 14 seconds, as diagrammed in FIG. 28B. When a random number of 5000 is obtained, on the other hand, the transmission will be made after (5000−3600)+1800=3200 seconds, that is, after 53 minutes 20 seconds, as diagrammed in FIG. 28C.

Figure 28C:
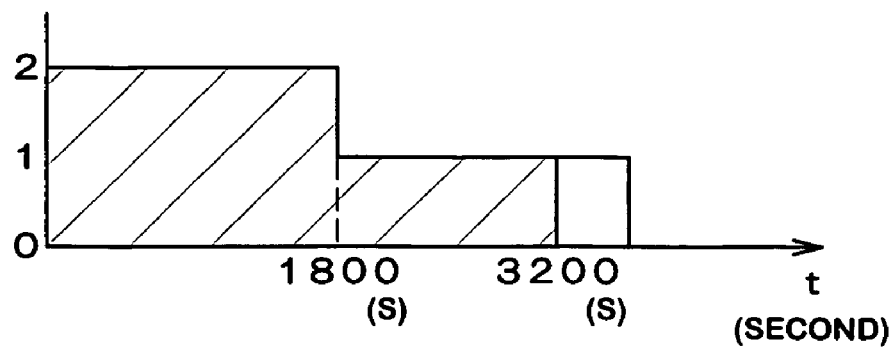
Figure 29A:
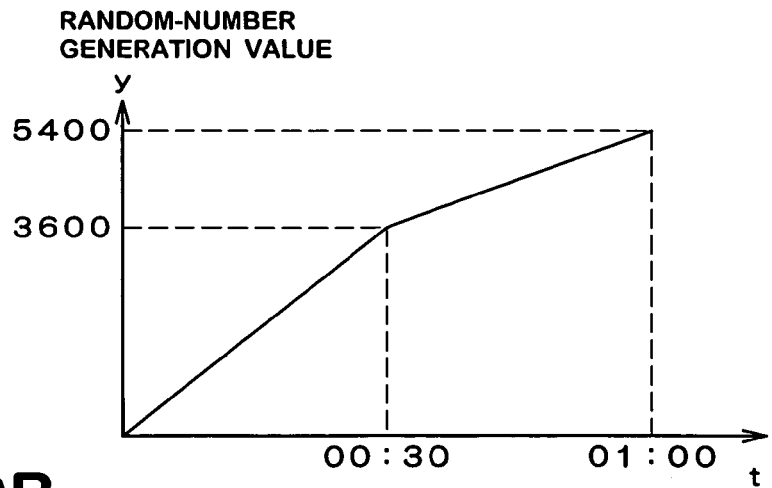
FIGS. 29A, 29B, and 29C are examples of a probability distribution function.
Figure 29B:
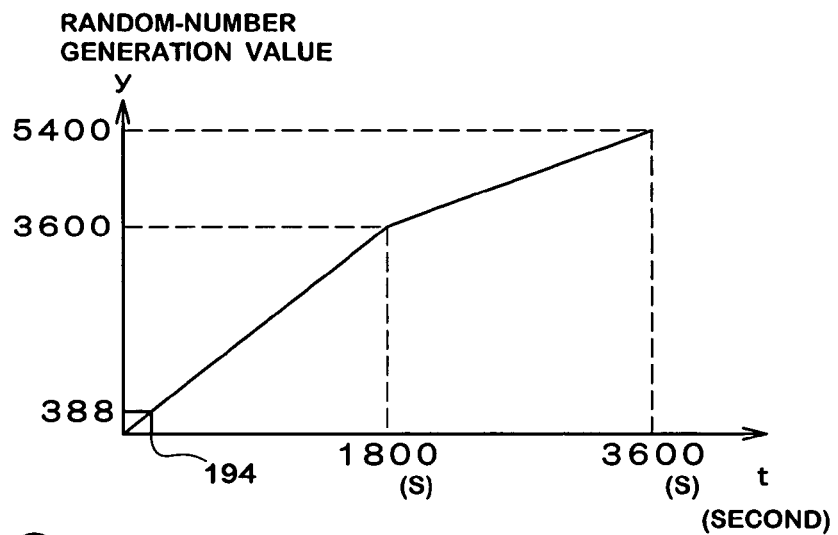
Figure 29C:
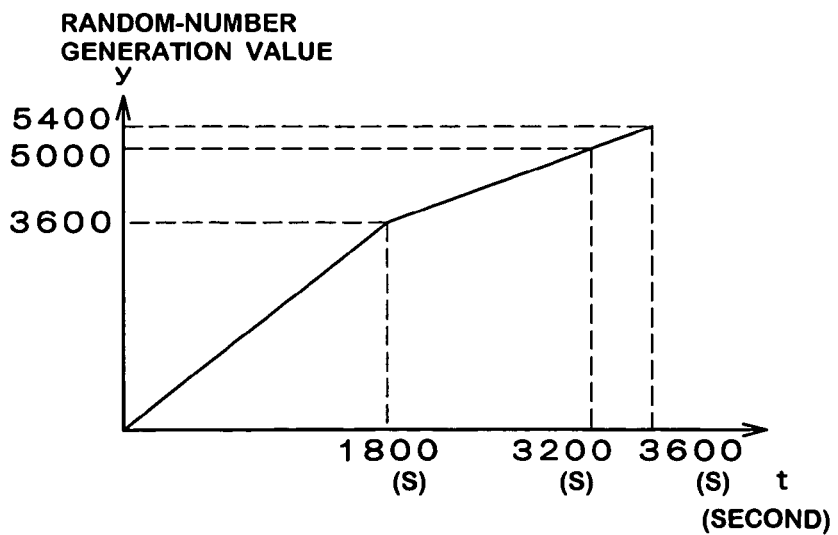

It is also permissible to specify the probability variation data with a probability distribution function like that diagrammed in FIG. 29 instead of with a probability density function like that diagrammed in FIG. 28. FIG. 29a represents FIG. 28a with a probability distribution, with generated random number values plotted on the vertical axis and time on the horizontal axis. This function can be defined, for example, as {(00:29:59, 3600), (00:59:59, 5400)}. The receiver generates a random number as the maximum value of a random number for the maximum value on the vertical axis in such a graph, finds the corresponding time on the horizontal axis, and makes that the delay time. Assuming, for example, that the value of the random number generated is 388, if the value of the random number generated is 3600 or less, then the definition is made t=½y. The transmission will therefore be after 388*½=194 seconds, that is, after 3 minutes 14 minutes, as diagrammed in FIG. 29B. If the random number 5000 is obtained, on the other hand, the definition will be made with t=y−1800, and the transmission will be made after 5000−1800=3200 seconds, as diagrammed in FIG. 28C, that is, after 53 minutes 20 seconds.

It is possible, furthermore, to determine not only the initial transmission scheduling time, but also the time to initiate a retrial, based on these probability variation data, without using the retrial period.

Moreover, instead of the procedure described above for dispersing the initial transmission scheduling time, delay dispersion processing may be done based on a time created by a user, or the ID of that receiver, etc., for example, as conventionally.

3. Other Embodiments

In this embodiment, the data format for the arguments in the navigation data has been described for the case where those data are text data, but the data format is not limited thereto, and may be a binary format. Neither is there any limitation on the type of arguments or on the order in which they are deployed in a script.

In the embodiment described in the foregoing, furthermore, provision is made to determine whether or not retrials should be suspended, but provision may also be made to alter the retrial conditions. For example, instead of making the retrial period a constant time period, such as every 5 minutes, for example, provision may be made so that the period can be altered according to the situation. Provision may be made, for example, to broadcast data to make the retrial period shorter as the service end time is approached. Alternatively, data may be transmitted to make the retrial period shorter when the number of retrials exceeds a certain number.

In the embodiment described in the foregoing, furthermore, provision is made so that the decision on whether or not to alter the retrial conditions is made autonomously, on the receiver end. However, provision may also be made to alter the retrial conditions based on a rewrite instruction from the center. In that case, the receiver may be made to determine whether or not a rewrite instruction has been received, instead of making the decision in step S323.

It is further permissible to configure such that the broadcast station is made to broadcast the condition alteration instruction noted above, so that the receivers receiving that instruction will alter the corresponding registration information, in whole or in part.

In this embodiment, description is given for the case where the conditions for altering the retrial processing are stored beforehand in the data receiver. However, provision may be made so that this is rewritten when a rewrite instruction is transmitted from the receiving end. Moreover, provision may be made so that a plurality of such conditions are established, so that any one can be designated for each incidence of delayed transmission registration information. Provision may also be made so that different retrial processing alteration conditions can be established for each script.

The registration information capable of editing from the transmitting end may be made any data in the delayed transmission registration information. Those data may be, for example, a retrial period that is retrial control information, or a product code that is response information, or a transmission scheduling time that is delayed transmission control information. For the various data subject to editing, moreover, the order registration number may be designated and an instruction transmitted to rewrite these directly, or, alternatively, a recomputation may be enforced. For the procedure for enforcing a recomputation, arguments in the script can be resent, and/or provision may be made to reference values in the navigation data for some of the arguments. Alternatively, only differential data may be sent. For example, for data having some registration number, a value to be added to the current retrial period may be transmitted as differential data, and recomputation enforced on the receiving end based on those differential data.

In cases where a plurality of data sets are merged, moreover, it is permissible to send only a merge instruction. In that case, the receiver that receives the merge instruction may reference two product codes, and synthesize those into one set of data having the two product codes. Also, provision may be made to delete the other registration data. In a case, for example, where the registration number 002 is the product code C200, the registration number 003 is data for purchasing the product code C300, and both are order information to be telephoned to the same center, provision may be made so that, when the merge instruction is received, the receiver reads the product code C300 from the registration number 003, rewrites the registration information for the registration number 002 to the product codes C200 and C300, and deletes the registration information for the registration number 003.

In this embodiment, description is given for cases where application is made to television receivers. However, application is possible in any situation whatever so long as there is a data receiver which receives broadcast data, and transmits response information that is either input thereto or automatically generated.

In this embodiment, furthermore, description is given for cases where public analog lines are used as the communication lines between the center and the data receivers. However, either ISDN lines or dedicated lines may also be used. In the case of dedicated lines, the delayed transmission registration information stored in memory may be the other party's ID instead of that party's telephone number.

In the embodiment described in the foregoing, moreover, provision is made for notifying a user of the results of a response to the center by displaying log data stored inside the receiver. However, it is also permissible to configure such that, when the center receives response information, a different communication medium such as a fax machine is used to notify the user that a delayed transmission was completed. The communication medium used here may be an automatic voice notification made by telephone, an electronic mail (e-mail) message, or a message function such as EMM (entitlement management message) in a satellite broadcast. By notifying the user of such data as these stored in the center by broadcast or by another line, a user can be notified of the results of responses with the center. Thus a user can be definitely notified that response information was received, either by another communication medium using the same line as the communication line between the center and the receiver, or by a communication line different from the communication line between the center and the receiver.

The registration information represented in FIG. 24 may also be displayed in a list on the screen. Provision may further be made so that, when the user selects items from among those displayed in the list, more detailed information (product image, price, etc.) can be displayed. Provision may also be made so that the user can edit the items displayed in the list. Alternatively, provision may be made to display sequentially instead of in a list.

In the embodiment described in the foregoing, moreover, description is given for the case where two types of video/audio ES are contained in one service SV11. However, the configuration may also be made so that one type of video/audio ES is transmitted in one service, and products described by video data change over time. In that case, provision may be made for transmitting navigation data having differing content corresponding thereto (having different product codes with an index of "2" in a character string table).

In the embodiment described in the foregoing, furthermore, a case is represented that is based on two video/audio data and two sets of navigation data. However three or more video/audio data and three or more sets of navigation data may be used. Alternatively, one set of navigation data may be used for a plurality of video/audio data, or a plurality of sets of navigation data may be used for one video/audio data.

Figure 30:
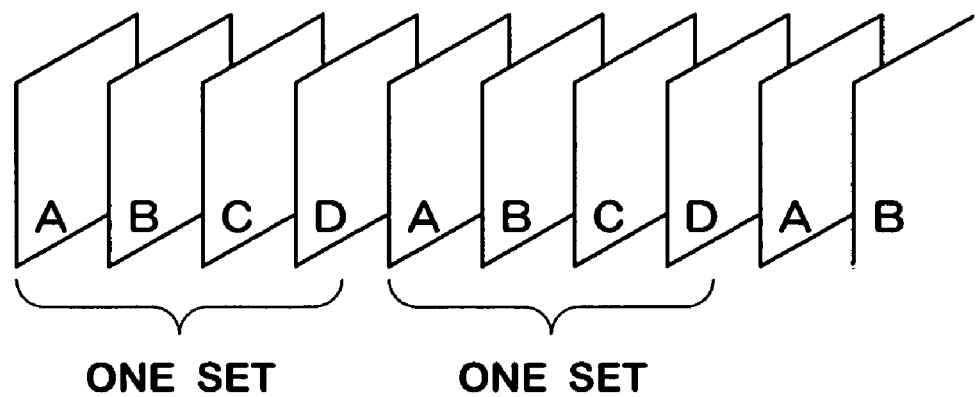
FIG. 30 is a diagram of how still videos are transferred.

In the embodiment described in the foregoing, moreover, provision is made to transmit, and receive, moving images as the video data. However, it is permissible to have still images transmitted, and received, as the video data. More specifically, as diagrammed in FIG. 30, by repeatedly sending one set of still images A, B, C, and D, as the video data ES, and writing the link relationships between these multiple still images A, B, C, and D into a hyperlink table and an object table in the navigation data, an interactive service can be realized as in the case of moving images described earlier.

Also, for products which could be purchase-registered or products for which purchase-registration failed, provision may be made so that product specification information such as product names and still images are stored in memory, and these are displayed after communications are completed.

In the present invention, moreover, what are called products are not limited to tangible objects, but include intangible services. Also, television shopping is described as an example, but the present invention can similarly be applied to viewer rating surveys, questionnaire information collection, and quiz shows, etc. Applications are also possible in cases where a computer-understandable request is broadcast, and collection data in a receiver are sent to a center, as in systems for charging fees for software (including contents as well as programs). In such cases, real response data corresponding to a product code, and a real response data ID that is an identifier for those real response data corresponding to an order registration number, may be sent to a center.

In this embodiment, furthermore, the case is described where a user inputs response information, but provision may be made so that response information is generated on the basis of data input by a user. In an example cited earlier, for example, the transmission scheduling time is not data input by the user, but is generated in response to data input by the user. Alternatively, this may be automatically produced by a data receiver, without data being input by the user. In the case of viewer rating surveys, for example, the response information can be automatically generated by the receiver.

In this embodiment, moreover, the service start time is later than the actual broadcast time. Accordingly, the user of a data receiver can enjoy the advantages provided by a particular service even in cases where the broadcast data are stored on hard disk or other recording medium, and then viewed in a viewable time period. In cases where a response was made after the broadcast started but before the service start time, in particular, delayed transmission is made from the receiver in response to the probability variation data described earlier.

In this embodiment, from the sending end, the telephone number of the transmitting party is used as a response information receiving equipment identifier, the product code is used as a response information number, and the service start time, initial transmission setting time width, service end time, and retrial period are used as delayed transmission control data. However, it is only necessary for the delayed transmission control data that data be included for controlling the delayed transmission, and provision may be made, for example, for storing the maximum number of retrials in memory instead of the service end time.

Figure 31:
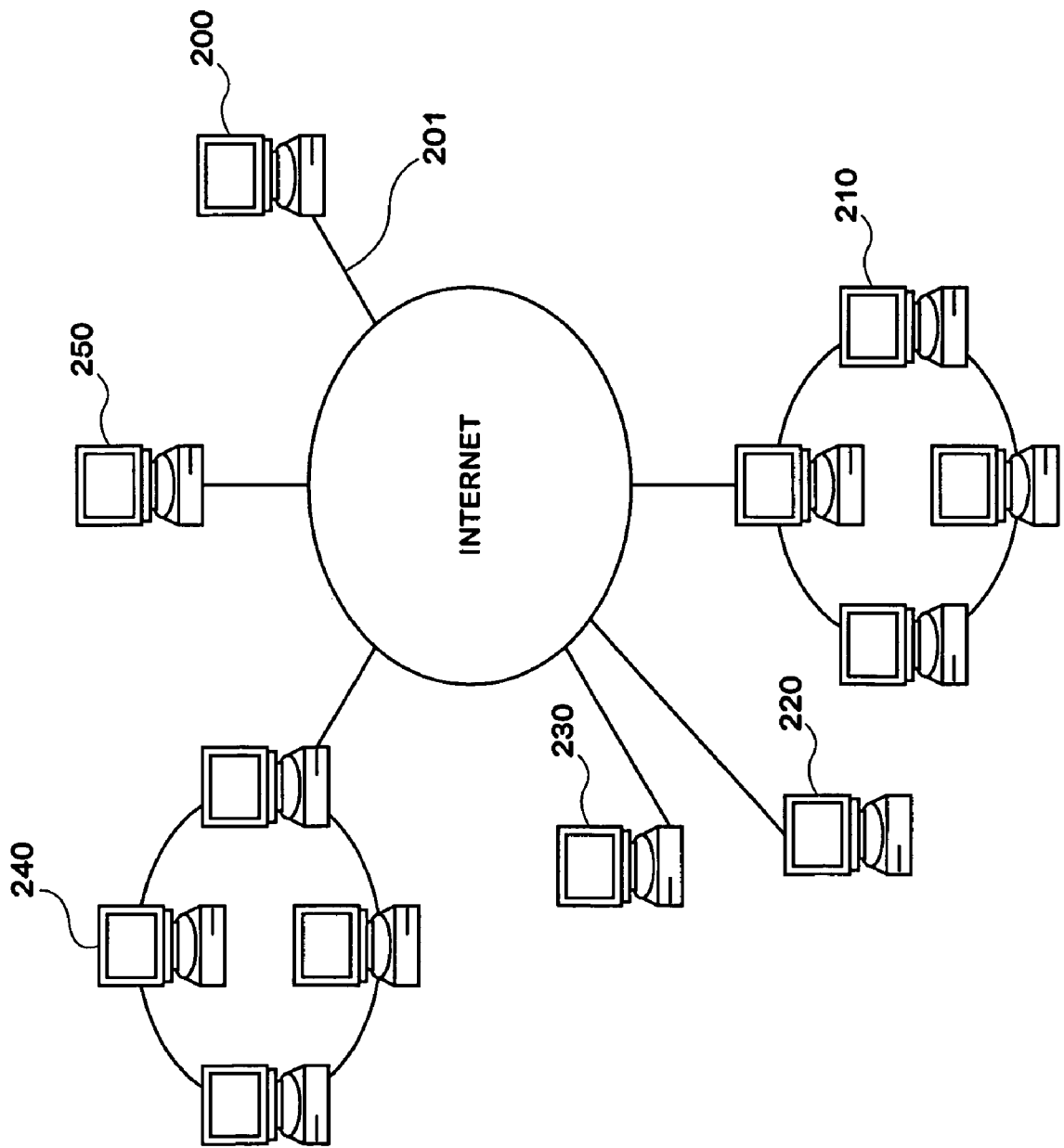
FIG. 31 is a diagram for describing another embodiment.

In this embodiment, furthermore, the description assumes the case where the broadcasting end and receiving end constitute one-to-many broadcasting, while the receiving end and response information receiving end constitute one-to-one communications. However, application is similarly possible in computer networks such as that diagrammed in FIG. 31. In FIG. 31, a server 200 is a WWW server, connected to the internet, which stores a plurality of contents, and, upon receiving a request, sends the corresponding contents to the computer of the requesting entity. In this case, when requests are made simultaneously from the computers 210, 220, 230, 240, and 250, if the contents to be distributed involve an enormous data volume, and the capacity of the line 201 is exceeded, a situation will arise wherein, during download, requests cannot be accepted from other computers. This might be a situation wherein download requests are concentrated in a particular period of time, as when a version upgrade has been released, for example. In such cases as this, the request concentration is a temporary phenomenon, and more often than not the concentration problem will no longer arise once that period has passed. In such cases as this, effective utilization is possible without increasing the capacity of the line 201 by taking the measures described below.

When requests are tendered simultaneously from the computers 210, 220, 230, 240, and 250, a download request delay control program is distributed to all the computers. That delay control program is a program which disperses the sending of the download start request already described to the server, and includes delay control information for delay processing. This delay control processing need only be capable of delayed transmissions, and is not limited to the delay processing described earlier.

Each computer computes transmission scheduling times based on the delay control information described earlier and stores them in memory. When a transmission scheduling time is reached, a download request is sent to the server 200. Thus, even if requests from the computers are concentrated, delay-dispersion can be effected. Accordingly, it is possible to disperse the requests coming from the computers according to the capacity of the line 201.

In this example, provision is made for making the dispersion in a time sequence. However, if a mirror site is available, the configuration may be such that the server 200 checks to see how busy the server at the mirror site is, and, depending on how busy it is, sets the other-party ID of the delay control program described above for some computers so that they download from the mirror site, so that download requests are dispersed between [itself and] the mirror site.

It is also permissible to divide the download server IDs according to the geographical location of the computers making the requests, and not only on how busy a mirror-site server is.

There are also cases where the computers are not always connected to the internet, but connect to an internet service provider computer over telephone lines. Provision may be made so that, in cases such as that, when the delayed transmission time is reached, calls are automatically made to connect to the internet, and download requests are then made. There are also cases where power to a computer is turned off. Provision may be made so that, in such cases as that, a power supply management program is left running, and, when the delayed transmission time is reached, the power is turned on and a download request is transmitted.

In order to tell whether a download request based on a delayed transmission is the first download request or not, provision may be made for sending data for making that distinction from the transmission-delaying program described earlier. In this embodiment, furthermore, the navigation data are transmitted together with the video data and audio data, but those data may be only the navigation data. In the case described, scripts are imbedded in the navigation data, so that execution processing is done on the receiving end based on those scripts. However, provision may be made for transferring HTML data. In that case, a browser program may be made available for interpreting and displaying the HTML data on the receiving end. It is permissible, moreover, to use such structural programming language data as SGML data, XML data, or MHEG data, etc., as well as HTML data.

In other words, the present invention can be applied in all cases where a center transmits transmission request data to the broadcasting entity, data receivers receive those transmission request data, and collection request data manually input or collection request data automatically input based on the transmission request data are sent to the center.

In the embodiment described in the foregoing, the response information receiving equipment can receive response information from television receivers according to the allowable volume on the communication lines made available to the response information receiving equipment. There will be cases, however, where the number of responses is greater than or less than the predicted allowable volume. Provision may be made so that, in such cases, rewrite information is sent from the response information receiving equipment 150 to the broadcast unit 140 for rewriting the delayed transmission registration information stored in the receivers, and broadcast simultaneously. In a case where, for example, there are more orders than the predicted volume for the order registration number "007," and the predicted volume has been sold out, rewrite information would be broadcast from the broadcasting entity to the receivers to cause the service end time for that order registration number "007" to be rewritten to the current time. The receivers receiving that information reference their own delayed transmission registration information table and, if order information for that order registration number "007" is present, rewrite the service end time to the present time. Thus responses from the receivers can be suspended.

In the case described above, provision is made for suspending the responses, but provision may also be made to extend the service end time or alter the retrial period. Provision may also be made for altering the probability variation data described earlier. That is, the data for controlling the delayed transmission can be controlled from the transmitting end. For example, provision may be made so that a script is broadcast which consolidates two sets of registration information going to a center having the same telephone number into one set of registration information, a delayed transmission registration information table is referenced on the receiving end, and that script is executed. The process for effecting such consolidation can be made so that communications effectiveness is optimized on the receiver end. With some broadcasts, however, there are cases where, even with the same telephone number, such consolidation is not desirable. In such cases as that, it will be preferable that the process on the receiving end be controlled on the transmitting end.

In this embodiment, provision is made for storing a display program in memory. It is permissible, however, to store such a program in an IC card, CD-ROM, or other recording medium, and then transfer the program via the IC card drive or CD-ROM drive to nonvolatile memory for storage. Such a program may also be transferred by communications and stored in nonvolatile memory.

In this embodiment, provision is made for fetching an ID for specifying a product purchaser from the IC card 56 or the memory 60, and transmitting it. However, it is also permissible to send a script as navigation data that will cause the name and address, etc., to be input on the screen.

Provision may also be made to store the delayed transmission registration information described earlier in rewritable nonvolatile memory. By so doing, that delayed transmission registration information can be saved even when the power supply fails as in a power outage.

In the embodiments described in the foregoing, the functions realized using a CPU may be implemented in whole or in part in hardware. In any of those embodiments, moreover, the functions implemented by hardware may be implemented in whole or in part using a CPU.

1) The data transceiving system relating to the present invention is a data transceiving system wherein data are sent from a broadcasting station to a plurality of television receivers by broadcasting, and response information is sent from the television receivers to response information receiving equipment by communication lines, wherein the broadcast station makes transmissions inclusive of retrial information to enable the television receivers to make retrial transmissions when the television receivers are unable to establish communications with the response information receiving equipment. Accordingly, the response information receiving equipment can more definitely receive the response information, even when the response information is transmitted after a delay. Furthermore, the retrial transmission processing in the television receivers can be controlled by data broadcast from the broadcast station.

2) In the data transceiving system relating to the present invention, the television receivers, upon receiving data containing retrial information to enable retrial transmissions with the response information receiving equipment when communications are not established with the response information receiving equipment, retransmit the response information on the basis of that retrial information. Accordingly, the response information receiving equipment can more definitely receive the response information even when the response information is transmitted after a delay. Furthermore, the retrial transmission processing in the television receivers can be controlled by data broadcast from the broadcast station.

3) In the data transceiving system relating to the present invention, the broadcast unit sends retrial information according to the allowable volume of the communication lines, included in the data, and the television receivers retrial-transmit the response information on the basis of the retrial information received when communications are not established with the response information receiving equipment. Accordingly, the response information receiving equipment can more definitely receive the response information even when the response information is transmitted after a delay. Furthermore, the broadcast unit can control the retrial transmission processing according to the allowable volume on the communication lines.

4) In the television receiver or data transceiving method relating to the present invention, in cases where communications could not be established with the response information receiving equipment, the response information is retrial-transmitted to the response information receiving equipment, on the basis of the retrial information received from the broadcast unit. Accordingly, the response information receiving equipment can more definitely receive the response information even when the response information is transmitted after a delay. Furthermore, the retrial transmission processing can be controlled with data broadcast from the broadcast station.

5) The data receiver relating to the present invention comprises means for receiving data sent from a broadcast unit, means for outputting display data based on those received data to display means, and communication means, being means that transmit response information over communication lines, for retrial-transmitting the response information, on the basis of retrial information contained in those data received from the broadcast unit, when communications could not be established with the response information receiving equipment. Accordingly, the response information receiving equipment can more definitely receive the response information even when the response information is transmitted after a delay. Furthermore, the retrial transmission processing in the data receiver can be controlled with data broadcast from the broadcast station.

6) The television receiver relating to the present invention comprises means for receiving data sent from a broadcast unit, means for displaying display data based on those received data, and communication means, being means that transmit response information over communication lines, for retrial-transmitting the response information, on the basis of retrial information sent from the broadcast unit, when communications could not be established with the response information receiving equipment. Accordingly, the response information receiving equipment can more definitely receive the response information even when the response information is transmitted after a delay. Furthermore, the retrial transmission processing in the television receiver can be controlled with data broadcast from the broadcast station.

7) The television receiver relating to the present invention specifies an initial transmission scheduling time with the response information receiving equipment, by random computation based on received delay information. Accordingly, the initial transmission scheduling time can be dispersed by the receiving end even when one delay information is broadcast from the broadcast station.

8) The television receiver relating to the present invention determines whether or not to make retrial transmissions based on a transmission end time sent from the broadcast unit. Accordingly, retrial transmissions can be suspended on the basis of the transmission end time.

9) The television receiver relating to the present invention comprises detection means for detecting causes of non-establishment of communications with the response information receiving equipment. Thus, by detecting the causes for communications failures, suitable action can be taken.

10) In the television receiver relating to the present invention, retrial condition alteration means alter the conditions for retrial transmissions from the next time on, based on the cause detected. Accordingly, retrial transmissions can be made with different condition depending on the communication failure cause detected.

11) In the television receiver relating to the present invention, the retrial condition alteration means alter the retrial transmission setting time width. Accordingly, retrial transmissions can be made with different setting time widths depending on the communication failure cause detected.

12) In the television receiver relating to the present invention, the retrial condition alteration means suspend retrial transmissions. Accordingly, retrial transmissions can be suspended depending on the communication failure cause detected.

13) In the television receiver relating to the present invention, notification data are generated for notifying notification means of the detected cause. Based on these notification data, users can be notified of communication failure causes.

14) In the television receiver relating to the present invention, time remaining for transmission is computed from a transmission end time sent from the broadcast unit, and the retrial transmission conditions are altered according to the time remaining for transmission. Accordingly, different retrial transmissions are possible depending on the time remaining for transmission.

15) In the television receiver relating to the present invention, notification data are generated for making notification of results of communications with the response information receiving equipment. Based on these notification data, users can be notified of the results of communications.

16) In the television receiver relating to the present invention, communication results are received from the response information receiving equipment and notification data for making notification thereof are generated. Accordingly, notification data can be generated which are based on the response information stored in the response information receiving equipment.

17) In the television receiver relating to the present invention, a history of communications with the response information receiving equipment is stored in memory, and notification data are generated. Accordingly, notification data can be generated which are based on the communications history with the response information receiving equipment.

18) In the television receiver relating to the present invention, the response information transmitted after the delay is stored in memory, and, when a notification instruction is sent from a user, notification is made of the response information. Thus a user can confirm the response information sent after the delay.

19) In the television receiver relating to the present invention, editing means edit the response information when an edit instruction is sent from a user. Thus a user can confirm response information subject to delayed transmission and edit that information to achieve suitable response information.

20) In the data receiver relating to the present invention, the communication means retrial-transmit the response information, based on retrial information contained in the data received, when communications could not be established with response information receiving equipment. Accordingly, the response information receiving equipment can more definitely receive the response information even when the response information is transmitted after a delay. Furthermore, the retrial transmission processing in the data receiver can be controlled with broadcast data.

21) In the data receiver relating to the present invention, when communications with the response information receiving equipment could not be established, retrial time specifying data are computed for specifying the retrial time, based on the retrial information, and, when the retrial time is reached, the response information stored in memory is retransmitted. Accordingly, the response information receiving equipment can more definitely receive the response information even when the response information is transmitted after a delay. Furthermore, the retrial transmission processing in the data receiver can be controlled with broadcast data.

22) The data receiver relating to the present invention specifies an initial transmission scheduling time with the response information receiving equipment, by random computation based on received delay information. Accordingly, the initial transmission scheduling time can be dispersed on the receiving end even when one set of delay information is broadcast from the broadcast end.

23) The data receiver relating to the present invention determines whether or not to make retrial transmissions based on a transmission end time sent from the broadcast unit. Accordingly, retrial transmissions can be suspended on the basis of the transmission end time.

24) The data receiver relating to the present invention comprises detection means for detecting causes of non-establishment of communications with the response information receiving equipment. Thus, by detecting the causes for communications failures, suitable action can be taken.

25) The data receiver relating to the present invention is a data transceiving system wherein data are sent from a broadcasting station to a plurality of data receivers by broadcasting, and response information is sent after a delay from the plurality of data receivers to response information receiving equipment by communication lines, and wherein the broadcast station sends retrial information contained in those data, the data receiver resends the response information based on the retrial information when communications could not be established with the response information receiving equipment, and the response information receiving equipment, upon receiving the response information from the data receiver, notifies the user of the data receiver that response information was received by a communication line other than those communication lines. Accordingly, conformation can be made as to whether or not response information could be sent to the response information receiving equipment in cases where the response information was transmitted after a delay.

26) The data receiver relating to the present invention comprises a tuner for selecting a transport stream from data sent from a broadcast unit, a transport decoder for selecting display data of a desired service from the selected transport stream, an AV decoder for outputting the display data of the selected service to a monitor, a control input unit wherewith a user inputs response information, a line communication unit for sending the response information over a communication line, a CPU, and a memory in which a control program for the CPU is stored, wherein the control program retrial-transmits the response information via the line communication unit, based on the retrial information contained in the data, when communications could not be established with the response information receiving equipment. Accordingly, in cases where the response information was transmitted after a delay, confirmation can be made as to whether or not the response information could be sent to the response information receiving equipment.

27) In the data transceiving system relating to the present invention, the server, upon receiving the download request, sends a download request transmission-delaying program to the computer making that download request, and the computer sends a download request, after a delay, to the server, based on the download request transmission-delaying program. Accordingly, it is possible to execute download requests and download processing at different times. Thus download requests can be prevented from concentrating.

28) The server in the data transceiving system relating to the present invention is a server connected to a plurality of computers which, upon receiving a download request from any computer, does not cause data specified by that download request to be transmitted to the computer making that download request, but rather sends thereto a download request transmission-delaying program which sends download requests to the server after a delay. Accordingly, the timing of the process of actually downloading to the computer can be shifted.

29) The data transceiving system relating to the present invention comprises 1) a broadcast unit for broadcasting data, 2) a plurality of television receivers for receiving the data, effecting displays based on the received data, and transmitting response information over communication lines, and 3) response information receiving equipment connected to the television receivers via the communication lines for receiving response information from the television receivers, wherein the broadcast unit sends probability variation data, included in the aforesaid data, wherewith the probability of generating a transmission time varies over time, and the television receivers determine transmission scheduling times for transmitting to the response information receiving equipment on the basis of the received probability variation data. Accordingly, when response information is caused to be transmitted after a delay in the television receivers, retrial transmission processing can be performed according to the allowable volume on the communication lines.

30) The data transceiving system relating to the present invention is a data transceiving system for transmitting data by broadcast from a broadcast station to a plurality of television receivers and transmitting response information from the television receivers to response information receiving equipment by communication lines, wherein the television receivers, upon receiving probability variation data wherein the probability wherewith transmission times are generated varies over time from the broadcast unit, determine transmission scheduling times for transmitting to the response information receiving equipment on the basis of the received probability variation data. Accordingly, when response information is transmitted after a delay, retrial transmission processing is performed according to the allowable volume on the communication lines.

31) In the data receiver relating to the present invention, when probability variation data wherein the probability wherewith transmission times are generated varies over time are received from the broadcast unit, the transmission scheduling time for transmitting to the response information receiving equipment is determined on the basis of the received probability variation data. Accordingly, retrial dispersion transmission processing is possible according to the allowable volume on the communication lines.

32) In the data receiver relating to the present invention, when a transmission start enabled time is received from the broadcast unit, the time until the transmission scheduling time is random-number generated using the received probability variation data, and the transmission scheduling time is determined. Accordingly, retrial dispersion transmission processing is possible according to the allowable volume on the communication lines.

33) In the data transceiving method relating to the present invention, when data inclusive of retrial information according to the allowable volume on the communication lines are received, when communication could not be established using the communication lines, the response information are retrial-transmitted on the basis of the received retrial information. Accordingly, response information can be more definitely received, even when the response information is transmitted after a delay. Furthermore, retrial transmissions are made according to the allowable volume on the communication lines.

34) The data transceiving method relating to the present invention is a data transceiving method which transmits response information over communication lines when broadcast data are received, wherein the data include probability variation data wherewith the probability of generating a transmission time varies over time, and the transmission scheduling time for transmitting over the communication lines is determined on the basis of the received probability variation data. Accordingly, the response information can be transmitted after a delay according to the allowable volume on the communication lines.

35) In the recording medium for storing a program, relating to the present invention, the program performs the following processing, namely, when communications could not be established with the response information receiving equipment, the response information are retrial-transmitted to the response information receiving equipment on the basis of retrial information received from the broadcast unit. Accordingly, response information can be more definitely received, even when the response information is transmitted after a delay. Furthermore, retrial transmissions are made according to the allowable volume on the communication lines.

36) In the recording medium for storing a program, relating to the present invention, the program performs the following processing, namely, 1) when probability variation data wherewith the probability of generating a transmission time varies over time are received, a transmission scheduling time for transmitting to the response information receiving equipment is determined on the bases of the received probability variation data. Accordingly, retrial dispersion processing is possible according to the allowable volume on the communication lines.

In this invention, the term "recording medium for storing a program" refers to a recording medium such as a ROM, RAM, flexible disk, CD-ROM, memory card, or hard disk, etc., on which a program is recorded. This concept also includes such communication media as telephone lines and transport routes. The concept also includes such recording media as CD-ROMs, etc., on which are recorded programs which are executed after first being installed on a hard disk or the like, and is not limited to recording media such as hard disks wherewith the recorded program is executed directly. Moreover, what is here called a program is inclusive of program source code, compressed programs, and encrypted programs, and is not limited to immediately executable programs. Furthermore, the navigation data in the embodiments are also included in this program concept.

The term "television receiver" refers of course to a set top box that is connected directly to a monitor, but is also inclusive of television receivers that have a built-in monitor.

The language "editing of input response information" refers of course to cases where actual data in input response information are altered, in whole or in part, but also includes the deletion of such response information.

The term "response information" refers to the data themselves that have been input by the user of a data receiver, to that which has been generated on the basis of data input by the user of a data receiver, to that which has been generated on the basis of received data, and to that which has been automatically collected.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A data transceiving system for causing a broadcasting station to transmit data to a plurality of television receivers through broadcasting and causing said television receivers to transmit response information to response information receiving equipment via a separate communication line, wherein each of said television receivers receive determining data for determining initial transmission scheduling time and retrial information containing a retrial period transmitted by said broadcasting station at the same time, and wherein the television receivers perform the following processing:

1) calculating the initial transmission scheduling time with a random number delay time at each of said receivers using the determining data for determining initial transmission scheduling time and storing the initial transmission scheduling time in memory;

2) transmitting the response information via a separate communication line when the initial transmission scheduling time comes;

3) when communication between the television receivers and the response information receiving equipment is unsuccessful, adding the retrial period to the initial transmission scheduling time to calculate retrial transmission scheduling time, and retransmitting the retrial information via a separate communication line at the calculated retrial transmission scheduling time;

4) when the retransmission of the retrial information has failed, calculating a subsequent retrial transmission scheduling time by adding the retrial period to the retrial transmission scheduling time and altering the condition of retrial transmission based on the subsequent retrial transmission scheduling time; and 5) repeating a process for retransmitting the retrial information via a separate communication line at the subsequent retrial transmission scheduling time until the retransmission of the retrial information is successful.

2. A television receiver for displaying images in response to receipt of data transmitted by a broadcasting device and for transmitting response information to response information receiving equipment via a separate communication line, wherein the television receiver performs the following processing:

1) receiving determining data for determining initial transmission scheduling time and retrial information containing a retrial period transmitted by said broadcasting station at the same time;

2) calculating the initial transmission scheduling time with a random number delay time at each of said receivers using the determining data for determining initial transmission scheduling time, storing the initial transmission scheduling time in memory, and receiving response information via a separate communication line when the initial transmission scheduling time comes;

3) when communication between the television receivers and the response information receiving equipment is unsuccessful, adding the retrial period to the initial transmission scheduling time to calculate retrial transmission scheduling time, and retransmitting the retrial information via a separate communication line at the calculated scheduling time;

4) when the retransmission of the retrial information has failed, calculating a subsequent retrial transmission scheduling time by adding the retrial period to the retrial transmission scheduling time and altering the condition of retrial transmission based on the subsequent retrial transmission scheduling time; and 5) repeating a process for retransmitting the retrial information via a separate communication line at the subsequent retrial transmission scheduling time until the retransmission of the retrial information is successful.

3. The television receiver according to claim 2, wherein determination as to whether or not to make retrial transmissions is based on a transmission end time sent from said broadcasting device.

4. The television receiver according to claim 2, comprising detection means for detecting causes of non-establishment of communications with said response information receiving equipment.

5. The television receiver according to claim 4, comprising retrial condition alteration means for altering conditions for subsequent retrial transmissions based on said detected causes.

6. The television receiver according to claim 5, wherein said retrial condition alteration means generate notification data for altering a setting time width for retrial transmissions.

7. The television receiver according to claim 5, wherein said retrial condition alteration means suspend retrial transmissions.

8. The television receiver according to claim 4, wherein notification data is generated for notifying of said detected causes.

9. The television receiver according to claim 2, wherein time remaining for transmission is computed from a transmission end time sent from said broadcasting device, and said retrial transmission conditions are altered according to said time remaining for transmission.

10. The television receiver according to claim 2, wherein notification data is generated for notifying of results of communications with said response information receiving equipment.

11. The television receiver according to claim 10, wherein communication results are received from said response information receiving equipment and notification data is generated.

12. The television receiver according to claim 10, wherein a history of communications with said response information receiving equipment is stored in a memory and notification data is generated.

13. The television receiver according to claim 3, comprising:

storing means for storing said response information to be transmitted after a delay; and notification means for notifying of said response information.

14. The television receiver according to claim 13, comprising editing means for editing said response information when an edit instruction is sent from a user.

15. A television receiver, comprising:

means for receiving data sent from a broadcasting device;

means for outputting display data to a display means based on said received data;

means for inputting response information by an operator based on display of said display data by said display means;

memory means for storing the response information, an initial transmission scheduling time, and a notification of an unsuccessful communication;

retrial condition alteration means for altering conditions of a retrial transmission; and communication means for transmitting said response information via a separate communication line, wherein said receiving means receives determining data for determining initial transmission scheduling time and retrial information containing a retrial period transmitted by said broadcasting station at the same time;

and wherein the communication means performs the following processing:

1) calculating the initial transmission scheduling time with a random number delay time using the determining data for determining initial transmission scheduling time, forwarding the initial transmission scheduling time to the memory means, and receiving response information via a separate communication line when the initial transmission scheduling time comes;
2) when communication between the television receiver and response information receiving equipment is unsuccessful, adding the retrial period to the initial transmission scheduling time to calculate retrial transmission scheduling time, and retransmitting the retrial information via a separate communication line at the calculated retrial scheduling time;
3) when the retransmission of the retrial information has failed, calculating a subsequent retrial transmission scheduling time by adding the retrial period to the retrial transmission scheduling time and altering the condition of retrial transmission based on the subsequent retrial transmission scheduling time; and
4) repeating a process for retransmitting the retrial information via a separate communication line at the subsequent retrial transmission scheduling time until the retransmission of the retrial information is successful.

16. A television receiver, comprising:
means for receiving data sent from a broadcasting device;
means for displaying data based on said received data;
memory means for storing an initial transmission scheduling time;
retrial condition alteration means for altering conditions of a retrial transmission; and
communication means for transmitting response information via a separate communication line,
wherein said receiving means determines data for determining the initial transmission scheduling time and retrial information containing a retrial period transmitted by said broadcasting device at the same time,
and wherein the communication means performs the following processing:

1) calculating the initial transmission scheduling time with a random number delay time using the determining data for determining initial transmission scheduling time, forwarding the initial transmission scheduling time to the memory means, and receiving response information via a separate communication line when the initial transmission scheduling time comes;
2) when communication between the television receiver and response information receiving equipment is unsuccessful, adding the retrial period to the initial transmission scheduling time to calculate retrial transmission scheduling time, and retransmitting the retrial information via a separate communication line at the calculated retrial transmission scheduling time;
3) when the retransmission of the retrial information has failed, calculating a subsequent retrial transmission scheduling time by adding the retrial period to the retrial transmission scheduling time and altering the condition of retrial transmission based on the subsequent retrial transmission scheduling time; and
4) repeating a process for retransmitting the retrial information via a separate communication line at the subsequent retrial transmission scheduling time until the retransmission of the retrial information is successful.

17. A data receiving device, comprising:
means for receiving data sent from a broadcasting device;
memory means for storing an initial transmission scheduling time;
retrial condition alteration means for altering conditions of a retrial transmission; and
communication means for transmitting response information via a separate communication line,
wherein said receiving means receives determining data for determining initial transmission scheduling time and retrial information containing a retrial period transmitted by said broadcasting device at the same time,
and wherein the communication means performs the following processing:

1) calculating the initial transmission scheduling time with a random number delay time using the determining data for determining initial transmission scheduling time, forwarding the initial transmission scheduling time to the memory means, and receiving response information via a separate communication line when the initial transmission scheduling time comes;
2) when communication between the data receiving device and response information receiving equipment is unsuccessful, adding the retrial period to the initial transmission scheduling time to calculate retrial transmission scheduling time, and retransmitting the retrial information via a separate communication line at the calculated retrial transmission scheduling time;
3) when the retransmission of the retrial information has failed, calculating a subsequent retrial transmission scheduling time by adding the retrial period to the retrial transmission scheduling time and altering the condition of retrial transmission based on the subsequent retrial transmission scheduling time; and
4) repeating a process for retransmitting the retrial information via a separate communication line at the subsequent retrial transmission scheduling time until the retransmission of the retrial information is successful.

18. The data receiver according to claim 17, wherein determination as to whether or not to make retrial transmission is made based on transmission end time provided by said broadcasting device.

19. The data receiver according to claim 17, comprising detection means for detecting causes of non-establishment of communications with said response information receiving equipment.

20. A television receiver, comprising:
a tuner for selecting a transport stream from data sent from a broadcasting device;
a transport stream decoder for selecting display data of a desired service from said selected transport stream;
an AV decoder for outputting said display data of said selected service to a monitor;
a control input unit for a user to input response information;
a line communication unit for sending said response information via a separate communication line;
a CPU;
retrial condition alteration means for altering conditions of a retrial transmission; and a memory in which a control program for said CPU is stored, and in which an initial transmission scheduling time is stored;
    wherein said tuner receives determining data for determining initial transmission scheduling time and retrial information transmitted by said broadcasting device at the same time,
    and wherein said control program performs the following processing:
    1) calculating the initial transmission scheduling time with a random number delay time using the determining data for determining initial transmission scheduling time, forwarding the initial transmission scheduling time to the memory, and receiving response information via a separate communication line when the initial transmission scheduling time comes;
    2) when communication between the line communication unit and the response information receiving equipment is unsuccessful, adding the retrial period to the initial transmission scheduling time to calculate retrial transmission scheduling time, and retransmitting the retrial information via a separate communication line at the calculated retrial transmission scheduling time;
    3) when the retransmission of the retrial information has failed, calculating a subsequent retrial transmission scheduling time by adding the retrial period to the retrial transmission scheduling time and altering the condition of retrial transmission based on the subsequent retrial transmission scheduling time; and
    4) repeating a process for retransmitting the retrial information via a separate communication line at the subsequent retrial transmission scheduling time until the retransmission of the retrial information is successful.

21. A data transceiving method for receiving data from a broadcast device and sending response information via a separate communication line to a response information receiving equipment, comprising:
    transmitting data for determining initial transmission scheduling time and retrial information containing a retrial period transmitted at the same time from said broadcasting device;
    receiving the determining data for determining the initial transmission scheduling time and retrial information containing the retrial period transmitted by the broadcasting station at the same time,
    calculating the initial transmission scheduling time with a random number delay time using the determining data for determining initial transmission scheduling time;
    storing the initial transmission scheduling time in memory;
    sending response information via a separate communication line to the response information receiving equipment at the initial transmission scheduling time thus determined;
    adding the retrial period to the initial transmission scheduling time to calculate retrial transmission scheduling time and retransmitting the retrial information via a separate communication line at the calculated retrial transmission scheduling time when communication between the television receiver and the response information receiving equipment is unsuccessful;
    calculating a subsequent retrial transmission scheduling time by adding the retrial period to the retrial transmission scheduling time and altering the condition of retrial transmission based on the subsequent retrial transmission scheduling time, when the retransmission of the retrial information has failed; and
    repeating a process for retransmitting the retrial information via a separate communication line at the subsequent retrial transmission scheduling time until the retransmission of the retrial information is successful.

22. A executable program embodied in a recording medium for controlling, by a computer, a television receiver that receives data broadcast from a broadcasting device and sends response information to response information receiving equipment via a separate communication line,
    wherein said executable program comprises instructions of:
    receiving determining data for determining initial transmission scheduling time and retrial information containing a retrial period transmitted at the same time from said broadcasting device;
    calculating the initial transmission scheduling time with a random number delay time using the determining data for determining initial transmission scheduling time;
    storing the initial transmission scheduling time in memory;
    sending response information via a separate communication line to the response information receiving equipment at the initial transmission scheduling time thus determined;
    adding the retrial period to the initial transmission scheduling time to calculate retrial transmission scheduling time, and retransmitting the retrial information via a separate communication line at the calculated retrial transmission scheduling time when communication between the television receiver and the response information receiving equipment is unsuccessful;
    calculating a subsequent retrial transmission scheduling time by adding the retrial period to the retrial transmission scheduling time and altering the condition of retrial transmission based on the subsequent retrial transmission scheduling time, when the retransmission of the retrial information has failed; and
    repeating a process for retransmitting the retrial information via a separate communication line at the subsequent retrial transmission scheduling time until the retransmission of the retrial information is successful.

23. A data receiving device, comprising:
    a tuner for receiving data sent from a broadcasting device;
    a memory for storing an initial transmission scheduling time and a notification of an unsuccessful communication;
    retrial condition alteration means for altering conditions of a retrial transmission; and
    a communication unit for transmitting response information via a separate communication line,
        wherein said tuner receives determining data for determining initial transmission scheduling time and retrial information containing a retrial period transmitted by said broadcasting device at the same time,
        and wherein the communication unit performs the following processing:
        1) calculating the initial transmission scheduling time with a random number delay time using the determining data for determining initial transmission scheduling time, forwarding the initial transmission scheduling time to the memory, and receiving response information via a separate communication line when the initial transmission scheduling time comes;
        2) when communication between the data receiving device and response information receiving equipment is unsuccessful, adding the retrial period to the initial transmission scheduling time to calculate retrial transmission scheduling time, and retransmitting the retrial information via a separate communication line at the calculated retrial transmission scheduling time;

3) when the retransmission of the retrial information has failed, calculating a subsequent retrial transmission scheduling time by adding the retrial period to the retrial transmission scheduling time and altering the condition of retrial transmission based on the subsequent retrial transmission scheduling time; and 4) repeating a process for retransmitting the retrial information via a separate communication line at the subsequent retrial transmission scheduling time until the retransmission of the retrial information is successful.

24. The data receiver according to claim 23, wherein determination as to whether or not to make retrial transmission is made based on transmission end time provided by said broadcasting device.

25. The data receiver according to claim 23, comprising detection means for detecting causes of non-establishment of communications with said response information receiving equipment.

* * * * *

UNITED STATES PATENT AND TRADEMARK OFFICE
CERTIFICATE OF CORRECTION

PATENT NO.         : 7,437,750 B1
APPLICATION NO. : 09/545851
DATED              : October 14, 2008
INVENTOR(S)        : Yasuyuki Sonoda, Tatsuya Shimoji and Kazuo Okamura Page 1 of 1

It is certified that error appears in the above-identified patent and that said Letters Patent is hereby corrected as shown below:

In the Claims should read:

Claim 15, column 31, line 22 "at the calculated retrial transmission scheduling time;"

Claim 21, column 33, line 57 "time, and retransmitting the retrial information via a"

Signed and Sealed this

Twenty-fourth Day of February, 2009

JOHN DOLL
*Acting Director of the United States Patent and Trademark Office*